US009112277B2

(12) United States Patent
Bauder

(10) Patent No.: US 9,112,277 B2
(45) Date of Patent: Aug. 18, 2015

(54) ADAPTIVE ANTENNA NEUTRALIZATION NETWORK

(75) Inventor: Ruediger Bauder, Feldkirchen-Westerham (DE)

(73) Assignee: RF Micro Devices, Inc., Greensboro, NC (US)

( * ) Notice: Subject to any disclaimer, the term of this patent is extended or adjusted under 35 U.S.C. 154(b) by 250 days.

(21) Appl. No.: 13/069,479

(22) Filed: Mar. 23, 2011

(65) Prior Publication Data

US 2011/0237207 A1 Sep. 29, 2011

Related U.S. Application Data

(60) Provisional application No. 61/316,712, filed on Mar. 23, 2010.

(51) Int. Cl.

| | |
|---|---|
| ***H04B 1/00*** | (2006.01) |
| ***H04B 17/00*** | (2006.01) |
| ***H04B 1/44*** | (2006.01) |
| ***H04B 1/40*** | (2006.01) |
| ***H01Q 1/52*** | (2006.01) |

(52) U.S. Cl.
CPC .................................... *H01Q 1/521* (2013.01)

(58) Field of Classification Search
USPC ....................... 455/78, 88, 553.1, 63.1, 67.11
See application file for complete search history.

(56) References Cited

U.S. PATENT DOCUMENTS

| | | | | |
|---|---|---|---|---|
| 1,708,944 | A | 4/1929 | Heising | |
| 5,841,407 | A * | 11/1998 | Birnbaum | 343/895 |
| 5,978,428 | A * | 11/1999 | Hayashi | 375/377 |
| 2002/0030557 | A1 * | 3/2002 | Kim et al. | 333/134 |
| 2009/0027286 | A1 * | 1/2009 | Ohishi et al. | 343/750 |
| 2009/0170438 | A1 * | 7/2009 | Gebara et al. | 455/63.1 |
| 2009/0174496 | A1 * | 7/2009 | Van Bezooijen | 333/17.3 |
| 2009/0322296 | A1 * | 12/2009 | Li et al. | 323/282 |
| 2010/0304692 | A1 * | 12/2010 | Lu et al. | 455/77 |

FOREIGN PATENT DOCUMENTS

| | | | |
|---|---|---|---|
| EP | 1 542 311 | A1 | 6/2005 |
| WO | 01/71846 | A1 | 9/2001 |
| WO | 2008/030165 | A1 | 3/2008 |

OTHER PUBLICATIONS

International Search Report for PCT/US2011/029506 mailed Aug. 2, 2011.

(Continued)

*Primary Examiner* — Ping Hsieh
*Assistant Examiner* — Xin Jia
(74) *Attorney, Agent, or Firm* — Withrow & Terranova, P.L.L.C.

(57) ABSTRACT

An adaptive antenna neutralization network (AANN) for neutralizing coupling between a first antenna and a second antenna of a mobile terminal is disclosed. The AANN includes an array of reactive branches. Each of the reactive branches includes a reactive element and an electrically controlled switch with a control input for selectively coupling the reactive element between the first antenna and the second antenna. Also included is a switch driver having an output coupled to the control input of each electrically controlled switch, and a controller having an output for sending control signals to the switch driver to turn on or off individual ones of the electrically controlled switches in response to conditions that indicate a coupling state between the first antenna and the second antenna.

19 Claims, 19 Drawing Sheets

(56) References Cited

OTHER PUBLICATIONS

Chebihi, A. et al., "Optimization of the neutralization technique to enhance the diversity performance of a two-antenna system for UMTS mobile phones," 2008 International Workshop on Antenna Technology: Small Antennas and Novel Metamaterials, Mar. 4-6, 2008, pp. 522-525, IEEE.

Diallo, A. et al., "Diversity Performance of Multiantenna Systems for UMTS Cellular Phones in Different Propagation Environments," International Journal of Antennas and Propagation, 2008, pp. 1-10, vol. 2008, Hindawi Publishing Corporation.

* cited by examiner

ADAPTIVE ANTENNA NEUTRALIZATION NETWORK

RELATED APPLICATION

This application claims the benefit of provisional patent application Ser. No. 61/316,712, filed Mar. 23, 2010, the disclosure of which is hereby incorporated herein by reference in its entirety.

FIELD OF THE DISCLOSURE

The present disclosure relates to neutralizing an undesirable coupling between antennas that share space within the structure of a user equipment (UE) such as a mobile terminal.

BACKGROUND

Multiple simultaneous transmissions and receptions from a mobile terminal are highly desirable for providing simultaneous Internet and voice communications. As a result, more than one antenna per mobile terminal is needed. Due to the relatively small dimensions of modern mobile terminals, the antennas are located in close proximity to each other. Thus, there is a significant risk that the antennas will couple with each other either capacitively or inductively. Such antenna coupling has the potential to degrade the performance of both transmissions and receptions during operation of a mobile terminal having multiple antennas. There have been prior art attempts to neutralize antenna coupling, but these prior art attempts have not been completely successful in handling antenna coupling. These unsuccessful attempts suffer from variability in antenna coupling environments. For example, a fluctuating voltage standing wave ratio (VSWR) caused by repositioning of a mobile terminal in relationship to a user's body cannot be accommodated by prior art antenna neutralization schemes. What is needed is an antenna neutralization network that adapts to a changing antenna coupling environment.

SUMMARY

The present disclosure provides an adaptive antenna neutralization network (AANN) for neutralizing coupling between a first antenna and a second antenna of a mobile terminal. The AANN of the present disclosure performs dynamic neutralization of the coupling between the first antenna and the second antenna for both predictable and unpredictable changes in antenna coupling environments. An example of a predictable change in an antenna coupling environment is a transmitter or receiver frequency change, while an unpredictable antenna coupling environment is voltage standing wave ratio (VSWR) changes due to a user's unpredictable repositioning of his mobile terminal in relationship to his body.

In order to accommodate dynamic neutralization of the coupling between the first antenna and the second antenna of a mobile terminal, the AANN includes an array of reactive branches. Each of the reactive branches includes a reactive element and an electrically controlled switch with a control input for selectively coupling the reactive element between the first antenna and the second antenna. Electrically controlled switches include, but are not limited to transistors and micro-electromechanical systems (MEMS) switches. Also included is a switch driver having an output coupled to the control input of each electrically controlled switch, and a controller having an output for sending control signals to the switch driver to turn on or off individual ones of the electrically controlled switches in response to conditions that indicate a coupling state between the first antenna and the second antenna.

The controller may include factory calibration settings that are associated with predictable changes in antenna coupling environments. In this way, when a predictable antenna coupling change occurs, the controller can quickly respond by commanding the switch driver to switch in or out appropriate ones of the reactive elements such that antenna coupling is neutralized or at least minimized. The AANN also includes a sensor for detecting the coupling state between the first antenna and the second antenna during unpredictable changes in the antenna coupling environment. Detection of the coupling state is fed back to the controller over a feedback path. In this way, the controller can compare the coupling state measured by the sensor with a desired minimal antenna coupling state and command the switch driver to switch in or switch out appropriate ones of the reactive elements such that antenna coupling can be neutralized or at least minimized.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
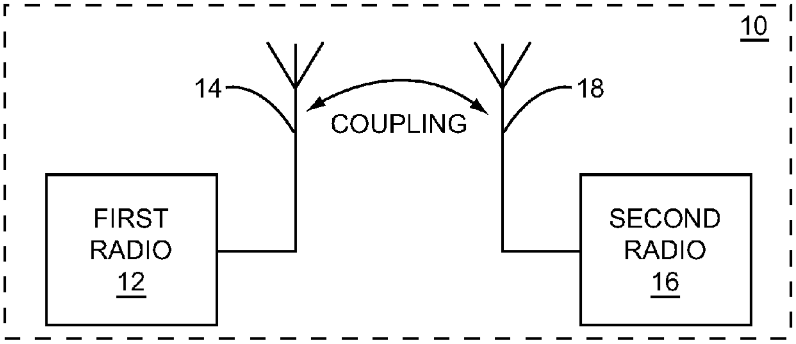
FIG. 1 is an illustration of a front end radio architecture (FERA) having two radios and two antennas that experiences undesirable antenna coupling between the two antennas.

FIG. 1 is an illustration of a front end radio architecture (FERA) 10 having a first radio 12 with a first antenna 14 and a second radio 16 with a second antenna 18 that experiences undesirable antenna coupling. The coupling between the first antenna 14 and the second antenna 18 may be capacitive or inductive depending on the structure of the FERA 10 along with the relative positioning between the first antenna 14 and the second antenna 18. The first antenna 14 and the second antenna 18 have the potential to load each other with transmitter power and noise. For example, due to the coupling, radio frequency power and noise can leak from the first antenna 14 to the second antenna 18, and vice versa.

Figure 2:
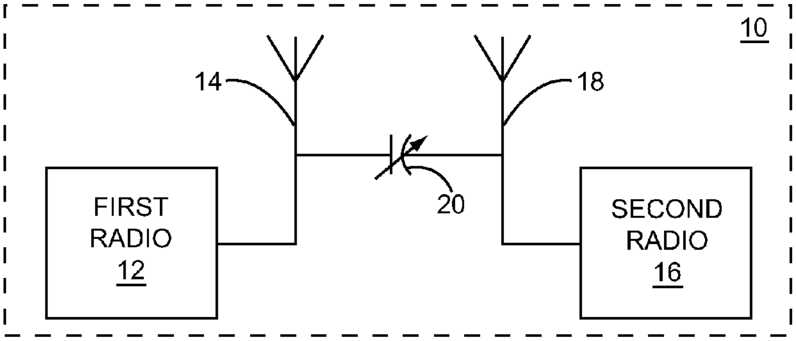
FIG. 2 is an illustration of the FERA of FIG. 1 that models the coupling between the two antennas using a capacitor model that is physically coupled between the two antennas.

FIG. 2 is an illustration of the FERA 10, wherein the coupling between the first antenna 14 and the second antenna 18 is capacitive. In this case, the coupling is modeled by a reactive element in the form of a capacitor 20. The capacitor 20 is directly coupled between the first antenna 14 and the second antenna 18.

Figure 3:
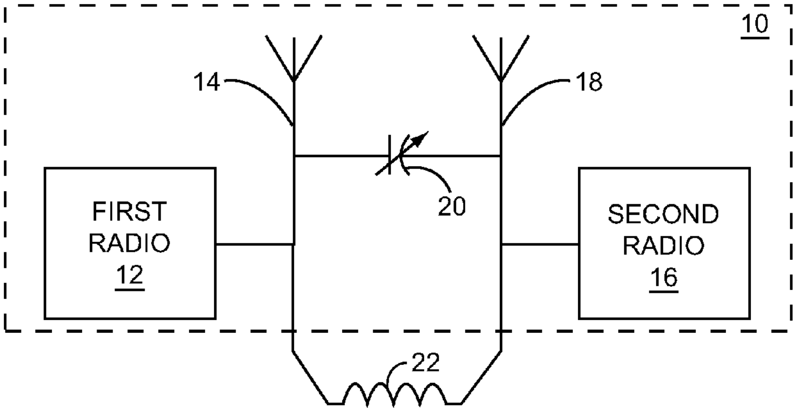
FIG. 3 is an illustration of the FERA of FIG. 1 that models a fixed neutralization of the antenna coupling by using an inductor model that is physically coupled between the two antennas.

FIG. 3 is an illustration of the FERA 10, further including a reactive element in the form of an inductor 22. The inductor 22 is coupled between the first antenna 14 and the second antenna 18, which places the capacitor 20 in parallel with the inductor 22. A value of inductance is selected for the inductor 22 such that a resonance exists between the capacitor 20 and the inductor 22 at a frequency of operation. As a result of the resonance, relatively large impedance is established between the first antenna 14 and the second antenna 18. The relatively large impedance effectively decouples the first antenna 14 and the second antenna 18, which eliminates or at least minimizes the possibility of radio frequency power and noise leaking from the first antenna 14 to the second antenna 18, and vice versa.

Figure 4:
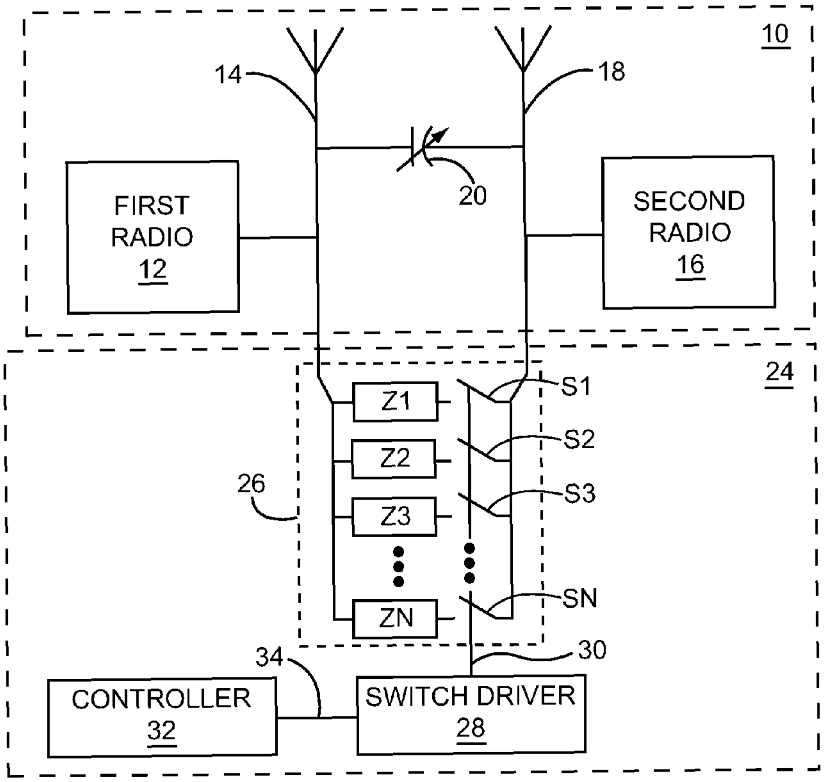
FIG. 4 is an illustration of an adaptive antenna neutralizing network (AANN) in accordance with the present disclosure, wherein the AANN includes an array of switchable reactive branches under the control of a controller via a switch driver.

FIG. 4 is an illustration of an adaptive antenna neutralizing network (AANN) 24 that is in accord with the present disclosure. In this case, a variable coupling between the first antenna 14 and the second antenna 18 of the FERA 10 is represented by the capacitor 20. The AANN 24 includes an array of switchable reactive branches 26 with reactive elements Z1-ZN and electrically controlled switches S1-SN that are driven by a switch driver 28 having a control output 30 that is under the control of a controller 32. The controller 32 includes an output 34 for sending switch control signals to the switch driver 28. The switch control signals are sent from the controller 32 in order to turn on and off individual ones of the switches S1-SN in response to conditions that indicate a coupling state between the first antenna 14 and the second antenna 18. Generally, the array of switchable reactive branches 26 is usable to neutralize the variable coupling between the first antenna 14 and the second antenna 18. For example, turning on the electrically controlled switch SN places the reactive element ZN in parallel with the capacitor 20 that represents the coupling between the first antenna 14 and the second antenna 18. Turning off the electrically controlled switch SN removes the reactive element ZN from being in parallel with the capacitor 20. Individual ones of the reactive elements Z1-ZN can be switched in or out of parallel with the capacitor 20 until anti-resonance for a given frequency is achieved to effectively neutralize the coupling between the first antenna 14 and the second antenna 18.

Figure 5:
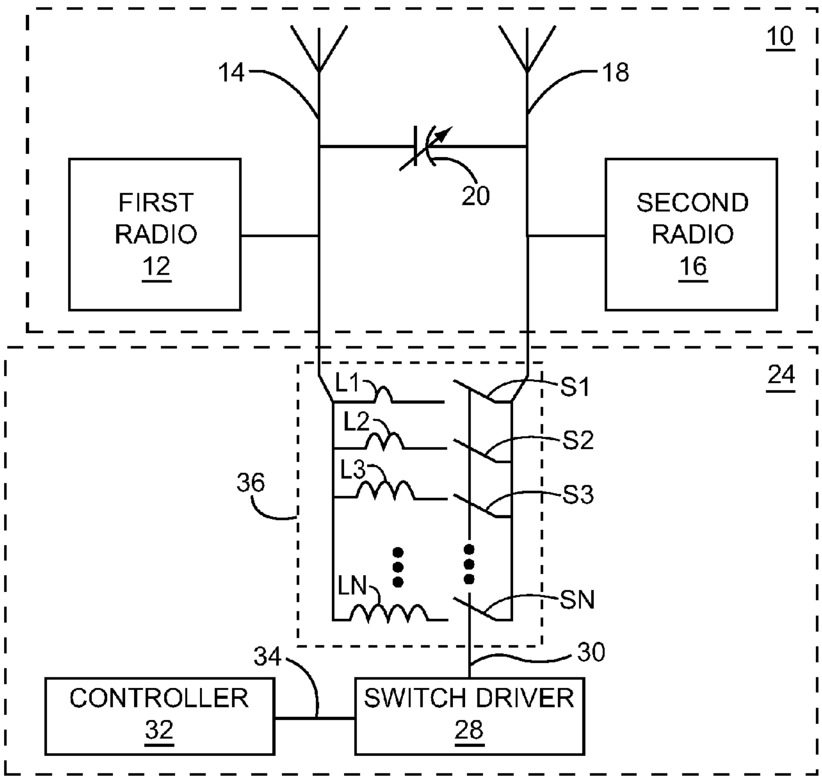
FIG. 5 depicts the AANN of FIG. 4, wherein the array of reactive branches is a programmable array of inductors (PAI).
Figure 6:
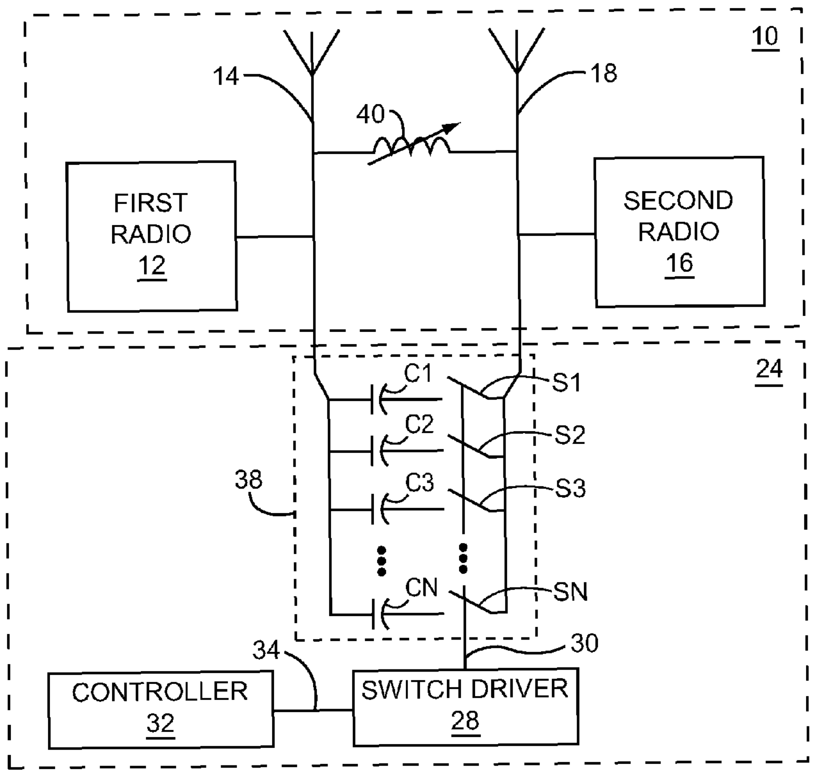
FIG. 6 depicts the AANN of FIG. 4, wherein the array of reactive branches of FIG. 4 is a programmable array of capacitors (PAC) 42.

FIG. 5 depicts the AANN 24, wherein the array of switchable reactive branches 26 of FIG. 4 is a programmable array of inductors (PAI) 36. The PAI 36 is particularly well suited for neutralizing strong capacitive coupling. In contrast, FIG. 6 depicts the AANN 24, wherein the array of switchable reactive branches 26 of FIG. 4 is a programmable array of capacitors (PAC) 38. The PAC 38 is usable to neutralize inductive coupling that is represented by a variable inductor 40.

Figure 7:
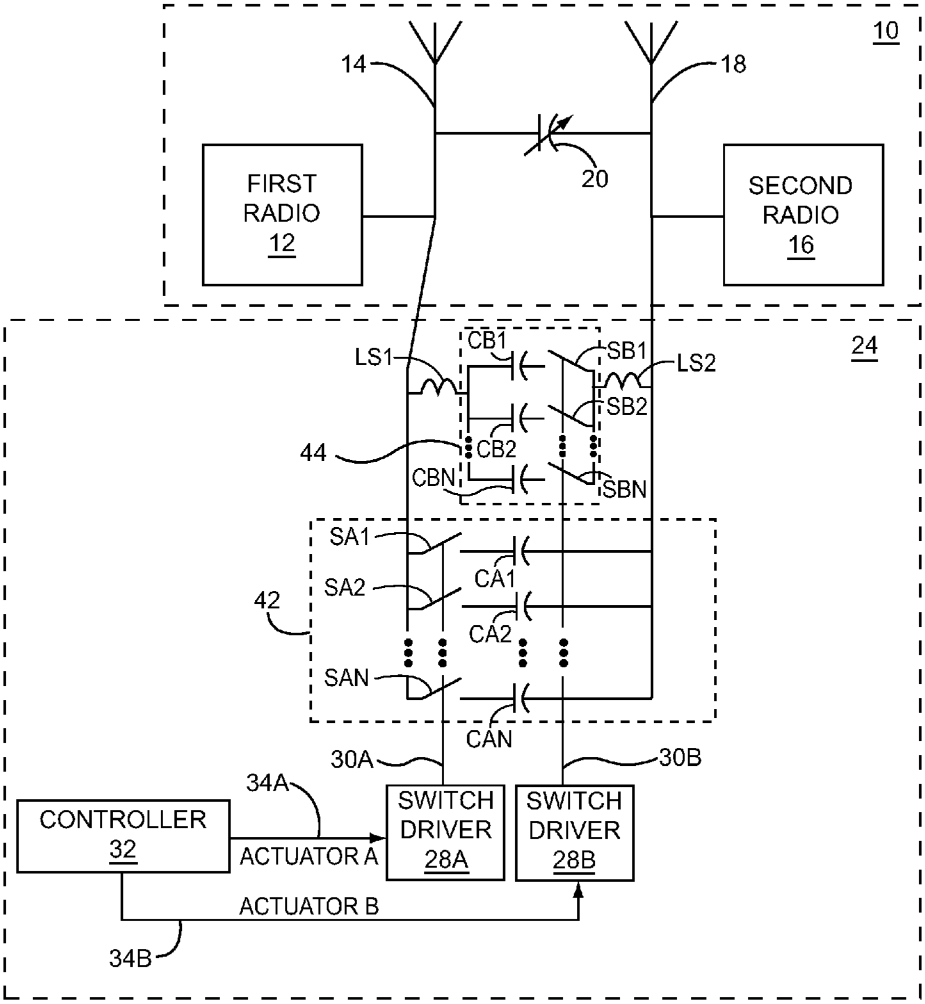
FIG. 7 depicts the AANN of FIG. 4, wherein the array of reactive branches includes sub-arrays comprising the PAI and the PAC.

FIG. 7 depicts the AANN 24, wherein the array of switchable reactive branches 26 of FIG. 4 includes a first PAC 42 comprising capacitors CA1-CAN and a second PAC 44 comprising capacitors CB1-CBN. Switches SA1-SAN are controllable via the controller 32 that outputs a signal ACTUATOR A to a switch driver 28A for switching individual ones of the capacitors CA1-CAN in and out of parallel with an antenna coupling represented by the capacitor C20. Switches SB1-SBN are controllable via the controller 32 that outputs a signal ACTUATOR B to a switch driver 28B for switching individual ones of the capacitors CB1-CBN in and out of series with a first inductor LS1 and a second inductor LS2 that are coupled between the first antenna 14 and the second antenna 18.

Figure 8:
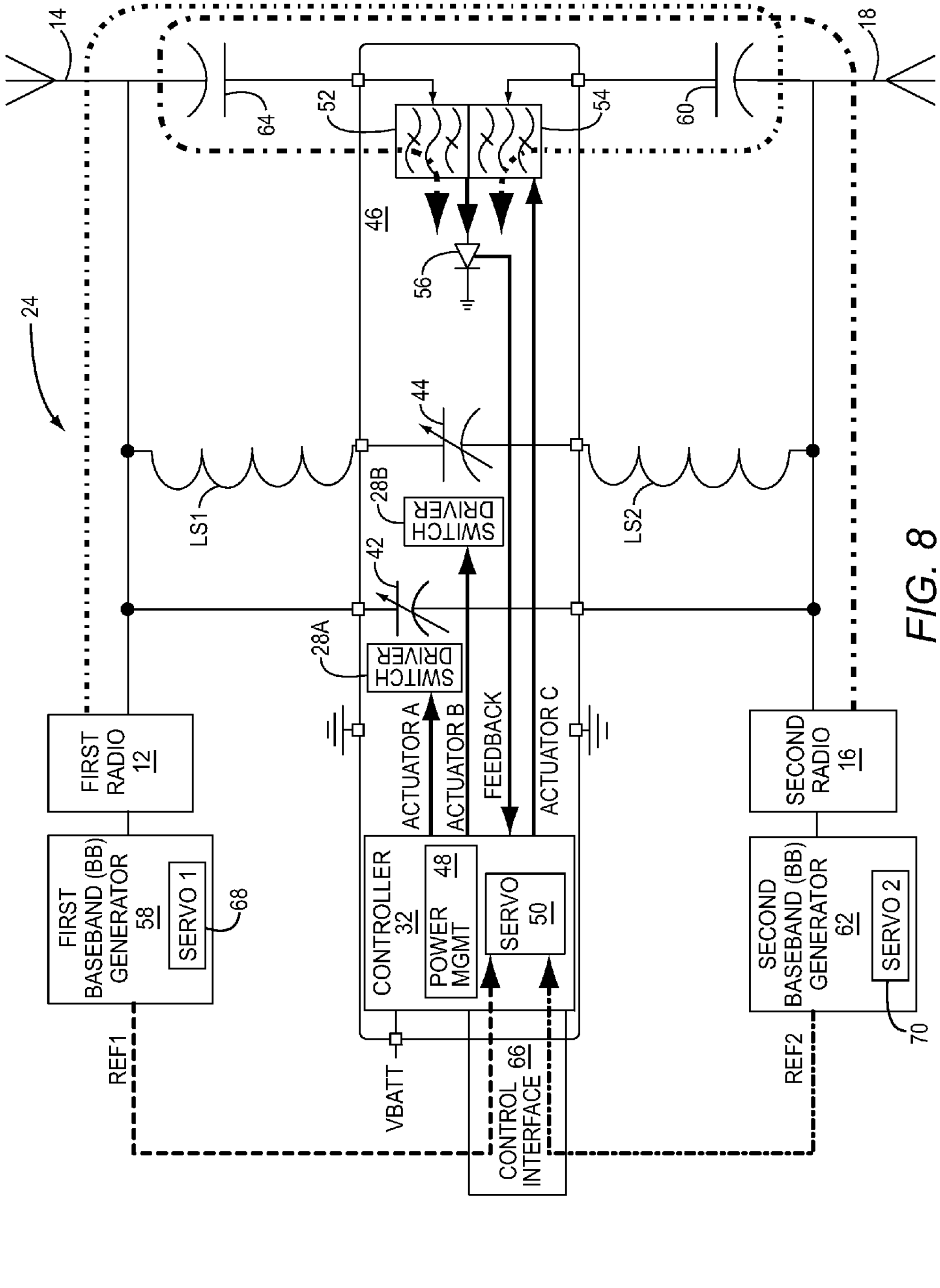
FIG. 8 depicts operational details of the AANN of FIG. 7.

FIG. 8 depicts operational details of the AANN 24 of FIG. 7. The AANN 24 includes a functional RF unit 46 that could be formed on a single die within a module or the functional RF unit 46 could be made up of separate dies contained in a single module or separate modules. The functional RF unit 46 includes the controller 32, which further includes a power management (PM) block 48 and a servo block 50. The functional RF unit 46 also includes the switch driver 28A, the switch driver 28B, the first PAC 42 and the second PAC 44, both of which are shown symbolically using variable capacitor symbols. The functional RF unit 46 further includes a first pre-selection filter 52 and a second pre-selection filter 54, and a sensor such as an RF detector 56.

In operation, a control loop for neutralizing the coupling between the first antenna 14 and the second antenna 18 is closed within the functional RF unit 46. In this particular case, a de-coupling of the first antenna and the second antenna is bi-directional. For example, in the AANN 24 can de-couple the first antenna 14 and the second antenna 18 while both the first antenna and the second antenna are simultaneously transmitting. A first transmit (TX) signal originating from the first radio 12 is represented by a thin dashed and dotted line, while a second TX signal originating from the second radio 16 is represented by a thick dashed and dotted line. The first radio 12 transmits the first TX signal in response to a first baseband (BB) generator 58. The first TX signal is broadcast from the first antenna 14. A portion of the first TX signal is captured by the second antenna 18, and a fraction of the captured portion of the first TX signal is coupled through a coupler such as a coupling capacitor 60 to the second pre-selection filter 54 and on into the RF detector 56. Similarly, the second radio 16 transmits the second TX signal in response to a second BB generator 62. A portion of the second TX signal is captured by the first antenna 14. A fraction of the captured portion of the second TX signal is coupled through a coupler such as coupling capacitor 64 to the first pre-selection filter 52 and passed on to the RF detector 56. Note that other types of couplers such as directional couplers can be used in place of the coupling capacitor 60 and the coupling capacitor 64.

Advantageously, due to being relatively lossy, the first pre-selection filter 52 and the second pre-selection filter 54 can be relatively inexpensive components of the functional RF unit 46. One or the other of the fractions of the captured portions of the first TX signal and/or the second TX signal or a sum or weighted sum of the first TX signal and the second TX signal passes through the RF detector 56 to the servo function 50 as a FEEDBACK signal.

The first BB generator 58 sets a reference signal REF1 that is input into the servo function 50 through a control interface 66 coupled to the controller 32. Likewise, the second BB generator 62 sets a reference signal REF2 that is input into the servo function 50 through the control interface 66. Both the REF1 signal and the REF2 signal can carry information such as TX frequency and estimated TX power for the first TX signal and the second TX signal, respectively. In response to the REF1 and the REF2 signals, the servo function 50 executes a coupling neutralization search scheme that outputs an ACTUATOR A signal for driving the first PAC 42 and an ACTUATOR B signal for driving the second PAC 44. The REF1 signal and the REF2 signal are used to generate the ACTUATOR C signal for tuning the first pre-selection filter 52 to the frequency of the second TX signal captured by the first antenna 14, and for tuning the second pre-selection filter 54 to the frequency of the first TX signal captured by the second antenna 18.

Figure 9:
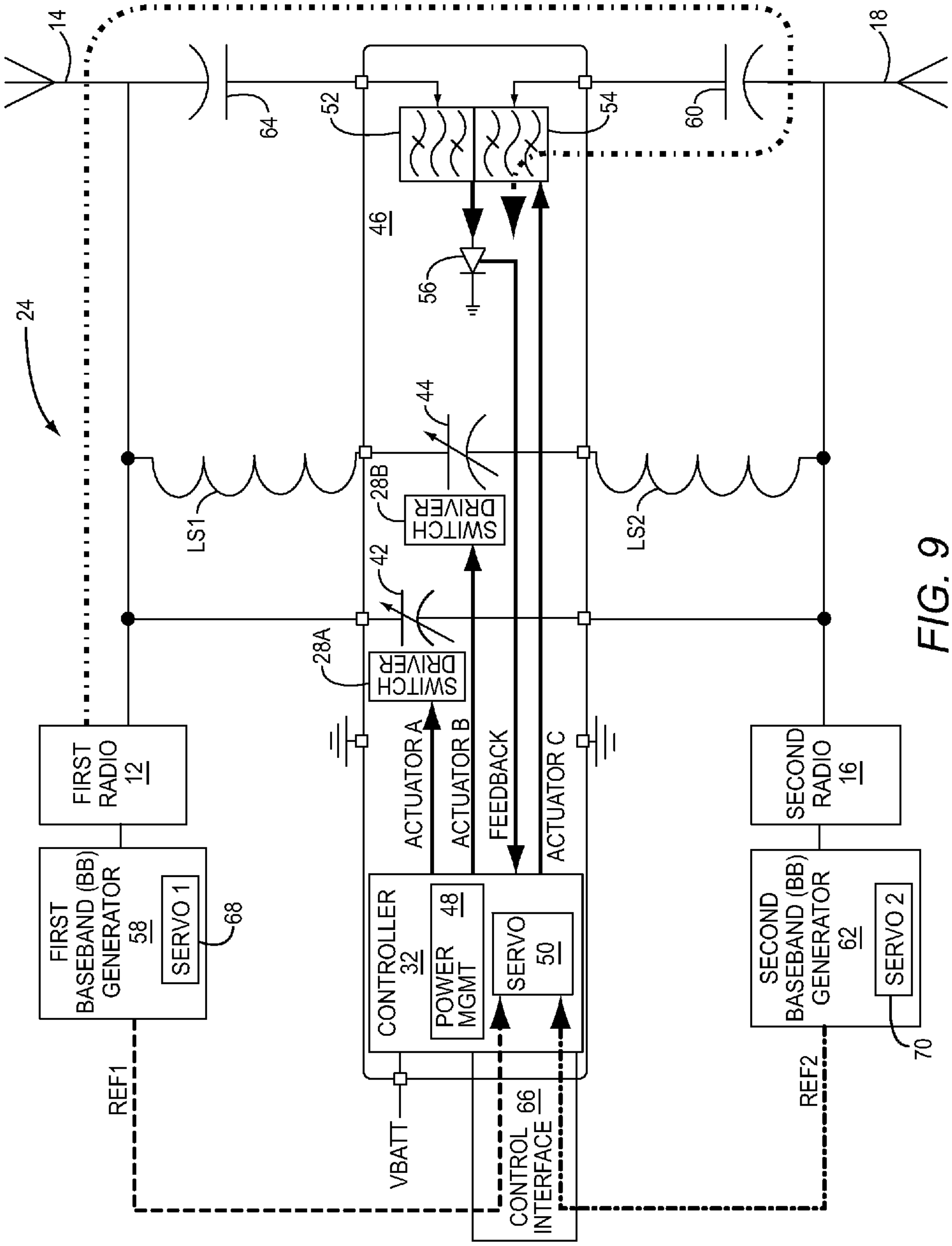
FIG. 9 depicts operational details of the AANN in which only the first antenna is used for transmission.

FIG. 9 depicts the AANN 24 in a configuration, wherein only the first antenna 14 broadcasts a TX signal. The implementation of the AANN 24 as configured in FIG. 9 is particularly well suited for multiple-input and multiple-output (MIMO) systems in which the first antenna 14 is usable for both transmission and reception, and the second antenna 18 is usable for reception only. In operation, the TX signal from the first antenna 14 may couple with the second antenna 18 and leak into the second radio 16 where undesirable intermodulation (IMD) products can be generated. In order to avoid producing the undesirable IMD products, the AANN 24 must be tuned to de-couple the first antenna 14 from the second antenna 18. A first step in decoupling the first antenna 14 from the second antenna 18 is to tune the second pre-selection filter 54 such that it will pass the first TX signal. In this way, an estimate of the power leaking into the second radio 16 from the first antenna 14 can be determined by using the RF detector 56 to detect a portion of the first TX signal that passes through the second pre-selection filter 54 due to coupling between the first antenna 14 and the second antenna 18. The estimate of the power leaking into the second radio 16 is passed from the RF detector 56 to the servo function 50 in the form of the FEEDBACK signal. The first BB generator 58 sets the reference signal REF1 that is input into the servo function 50 through the control interface 66. In response to the feedback of the estimate of the power leaking into the second radio 16 and the REF1 signal, the servo function 50 outputs appropriate magnitudes of the ACTUATOR A signal and the ACTUATOR B signal to drive the first PAC 42 and the second PAC 44 such that the first antenna 14 is isolated from the second antenna 18. In this way, the power leaking into the second radio 16 will practically drop to zero, thereby practically eliminating the generation of IMD products within the second radio 16. Advantageously, front end components (not shown) associated with the second antenna 18 can have reduced linearity characteristics due to the implementation of the AANN 24. The reduced linear characteristics for the front end components allows significantly less expensive front end components to be used in place of traditionally more expensive components that are associated with the second antenna 18.

Figure 10:
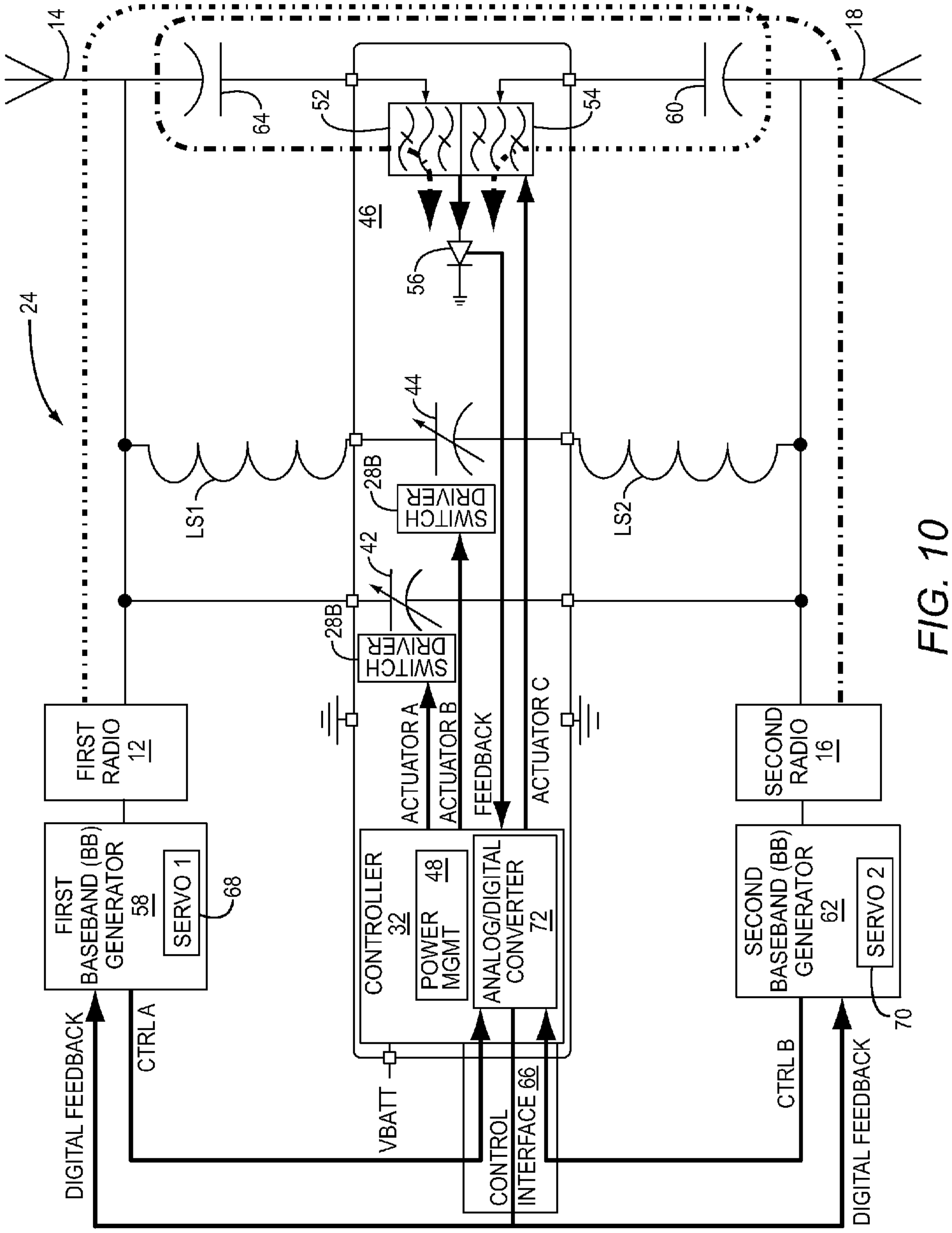
FIG. 10 depicts operational details of the AANN, wherein feedback is passed to baseband (BB) generators for more sophisticated control of antenna neutralization.

FIG. 10 depicts another configuration for the AANN 24. In the particular case of FIG. 10, the first antenna 14 and the second antenna 18 are both usable for transmission and reception. In contrast to the configurations used with the AANN 24 of FIGS. 8 and 9, two feedback loops for controlling the AANN 24 are closed within the first BB generator 58 and the second BB generator 62. In order to close the feedback loops, the AANN 24 has a first servo function 68 that is included with the first BB generator 58, and a second servo function 70 that is included with the second BB generator 62. Either of the first BB generator 58 or the second BB generator 62 is adapted to execute a signal to noise (S/N) estimator program that provides a discriminator function for a gradient search algorithm that selects appropriate reactive elements to couple between the first antenna 14 and the second antenna 18 to minimize antenna coupling.

In operation, the FEEDBACK signal generated by the RF detector 56 is an estimate of the power leaking into the first radio 12 and the second radio 16. The FEEDBACK signal is passed to the servo function 50 where the FEEDBACK signal is converted into a DIGITAL FEEDBACK signal by an analog-to-digital (A/D) converter 72. The DIGITAL FEEDBACK signal is output to both the first servo function 68 of the first BB generator 58 and the second servo function 70 of the second BB generator 62. In response to the DIGITAL FEEDBACK signal, the first BB generator 58 outputs a control signal CTRL A and the second BB generator 62 outputs a control signal CTRL B. Both the CTRL A signal and the CTRL B signal are usable by the controller 32 to adjust the ACTUATOR A signal, the ACTUATOR B signal, and the ACTUATOR C signal such that the first antenna 14 and the second antenna 18 are decoupled.

Figure 11:
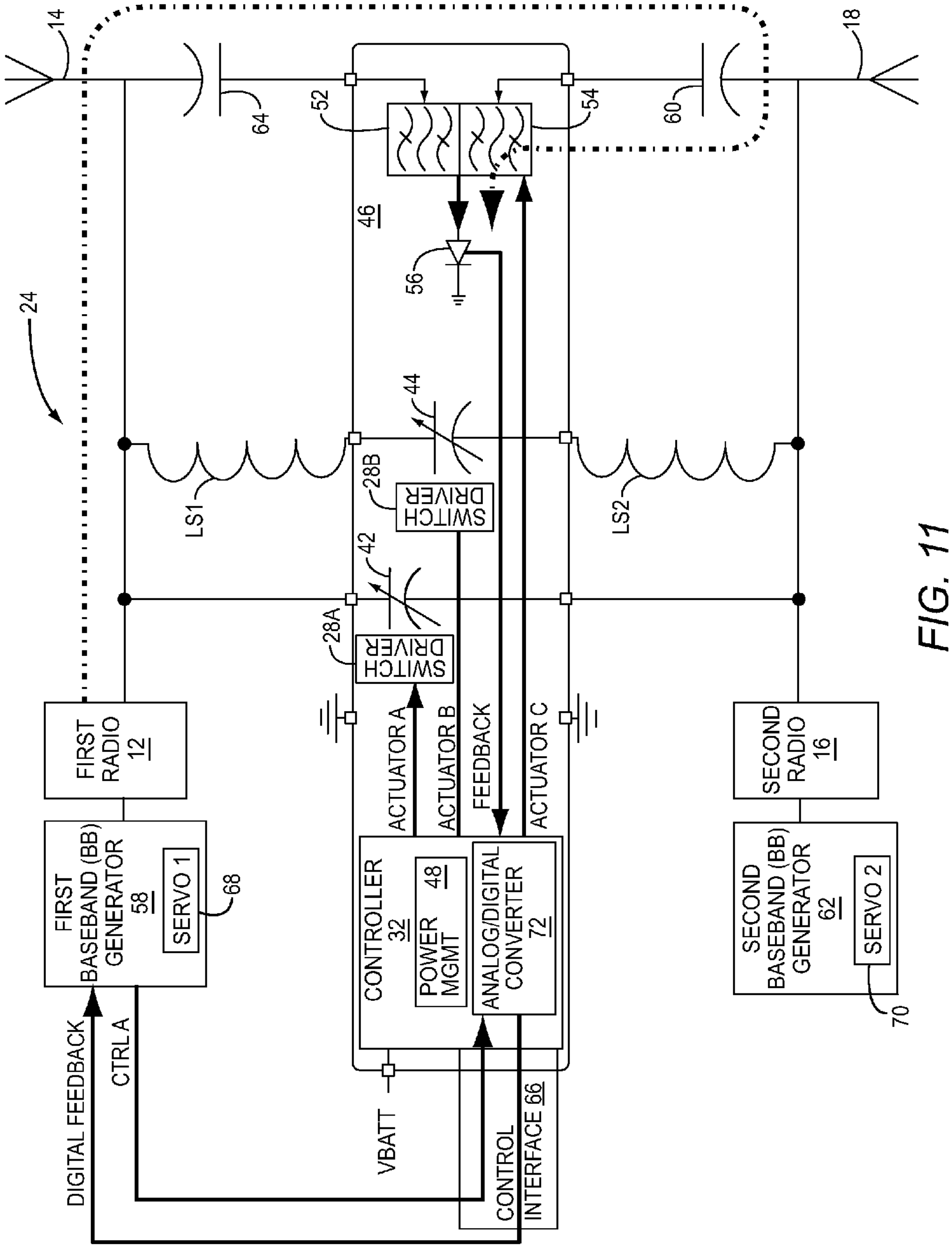
FIG. 11 depicts operational details of the AANN that is particularly well suited for multiple-input and multiple-output (MIMO) systems.

FIG. 11 depicts the AANN 24 in a configuration in which only the first antenna 14 broadcasts a TX signal. The implementation of this configuration of the AANN 24 is particularly well suited for multiple-input and multiple-output (MIMO) systems in which the first antenna 14 is usable for both transmission and reception, and the second antenna 18 is usable for reception only. In this case, the first TX signal broadcast from the first antenna 14 has the potential to generate IMD products in the second radio 16 if the first antenna

14 and the second antenna 18 are coupled such that the second antenna 18 captures a portion of the first TX signal. In order to decouple the first antenna 14 from the second antenna 18, a fraction of the portion of the TX signal captured by the second antenna 18 is fed through the second pre-selection filter 54 where it is detected by the RF detector 56. The FEEDBACK signal generated by the RF detector 56 is passed to the controller 32. The A/D converter 72 converts the FEEDBACK signal into the DIGITAL FEEDBACK signal that is passed from the controller 32 to the first BB generator 58 via the control interface 66. In response to the DIGITAL FEEDBACK signal, the first BB generator 58 in cooperation with the first servo function 68 outputs the control signal CTRL A to the controller 32, which in turn adjusts and outputs the ACTUATOR A signal, the ACTUATOR B signal, and the ACTUATOR C signal such that the first antenna 14 and the second antenna 18 are decoupled.

Figure 12:
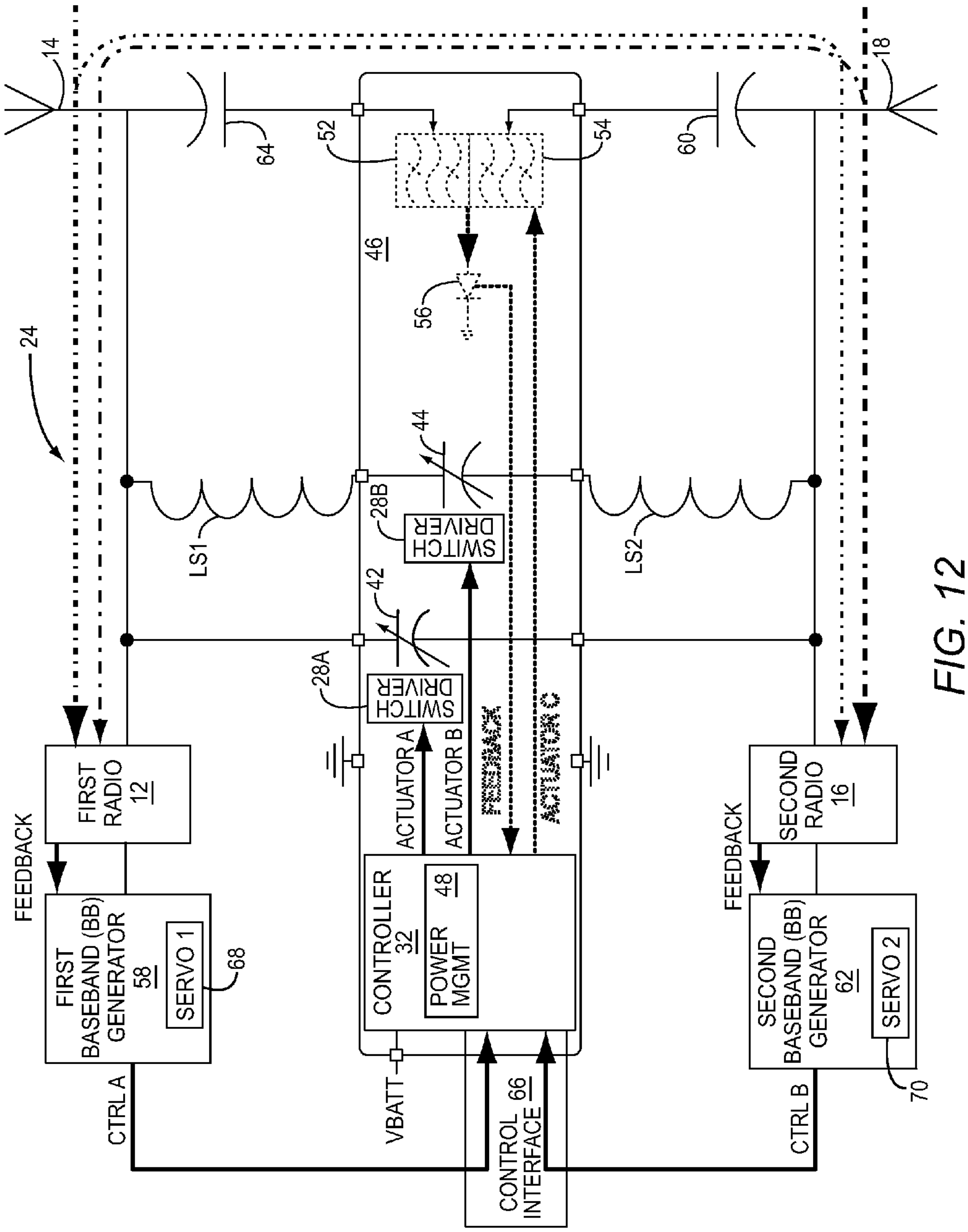
FIG. 12 depicts operational details for the AANN in which the first antenna and the second antenna are used for reception only.

FIG. 12 depicts the AANN 24 in which both the first antenna 14 and the second antenna 18 are usable for reception only while in a receive only mode. In this case, the first pre-selection filter 52, the second pre-selection filter 54, and the RF detector 56 do not have enough dynamic range to effectively generate the FEEDBACK signal. Therefore, the first pre-selection filter 52, the second pre-selection filter 54, the RF detector 56, and the ACTUATOR C signal are not usable in controlling the AANN 24. As such, the first pre-selection filter 52, the second pre-selection filter 54, the RF detector 56, and the ACTUATOR C signal are shown in dashed line in FIG. 12 to represent their inactivity in the receive only mode. In order to provide feedback that is usable for controlling the AANN 24, feedback is produced by the first radio 12 and the second radio 16 directly. The feedback from the first radio 12 is passed to the first BB generator 58, which in turn and in cooperation with the first servo function 68 outputs the control signal CTRL A that is received by the controller 32. Similarly, the feedback from the second radio 16 is passed to the second BB generator 62, which in turn and in cooperation with the second servo function 70 outputs the control signal CTRL B that is received by the controller 32. The controller processes the control signal CTRL A and the control signal CTRL B to appropriately adjust the ACTUATOR A signal and the ACTUATOR B signal such that the first antenna 14 and the second antenna 18 are decoupled from each other.

Figure 13:
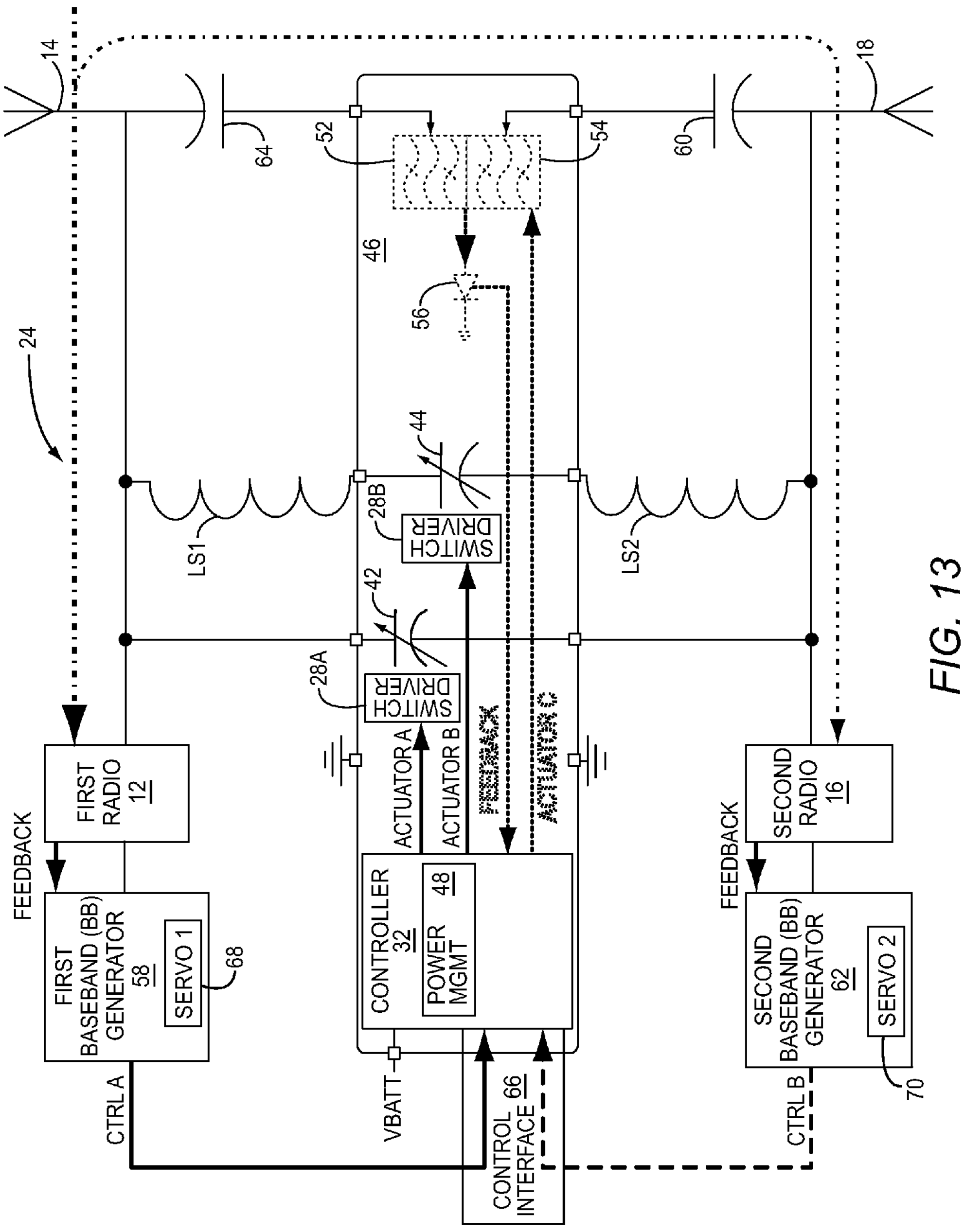
FIG. 13 depicts operational details for the AANN in which only the first radio is powered to provide feedback.

FIG. 13 is similar to FIG. 12 in that it depicts the AANN 24 configured such that the first antenna 14 and the second antenna 18 are both used for reception in the receive only mode. Like the previous case of FIG. 12, the first pre-selection filter 52, the second pre-selection filter 54 and the RF detector 56 do not have enough dynamic range to effectively generate the FEEDBACK signal. As such, the first pre-selection filter 52, the second pre-selection filter 54, the RF detector 56, and the ACTUATOR C signal are shown in dashed line in FIG. 13 to represent their inactivity in the receive only mode.

In order to provide feedback that is usable for controlling the AANN 24, feedback is produced by the first radio 12 directly. However in this case, a first attempt to control the AANN 24 only involves the control signal CTRL A. The advantage of only using the control signal CTRL A is that the second radio 16 is not powered during this first attempt at controlling the AANN 24. As in the previous case, the controller 32 processes the control signal CTRL A to appropriately adjust the ACTUATOR A signal and the ACTUATOR B signal such that the first antenna 14 and the second antenna 18 are decoupled from each other. However, if the first attempt is unsuccessful, the second radio 16 is powered up to provide feedback to the second BB generator 62, which in cooperation with the second servo function 70 outputs the control signal CTRL B. At this point, the controller 32 processes the control signal CTRL A and the control signal CTRL B to appropriately adjust the ACTUATOR A signal and the ACTUATOR B signal such that the first antenna 14 and the second antenna 18 are decoupled from each just as with the previous case represented by FIG. 12. The control signal CTRL B is shown in dashed line in FIG. 13 to represent the optional nature of the control signal CTRL B.

Figure 14:
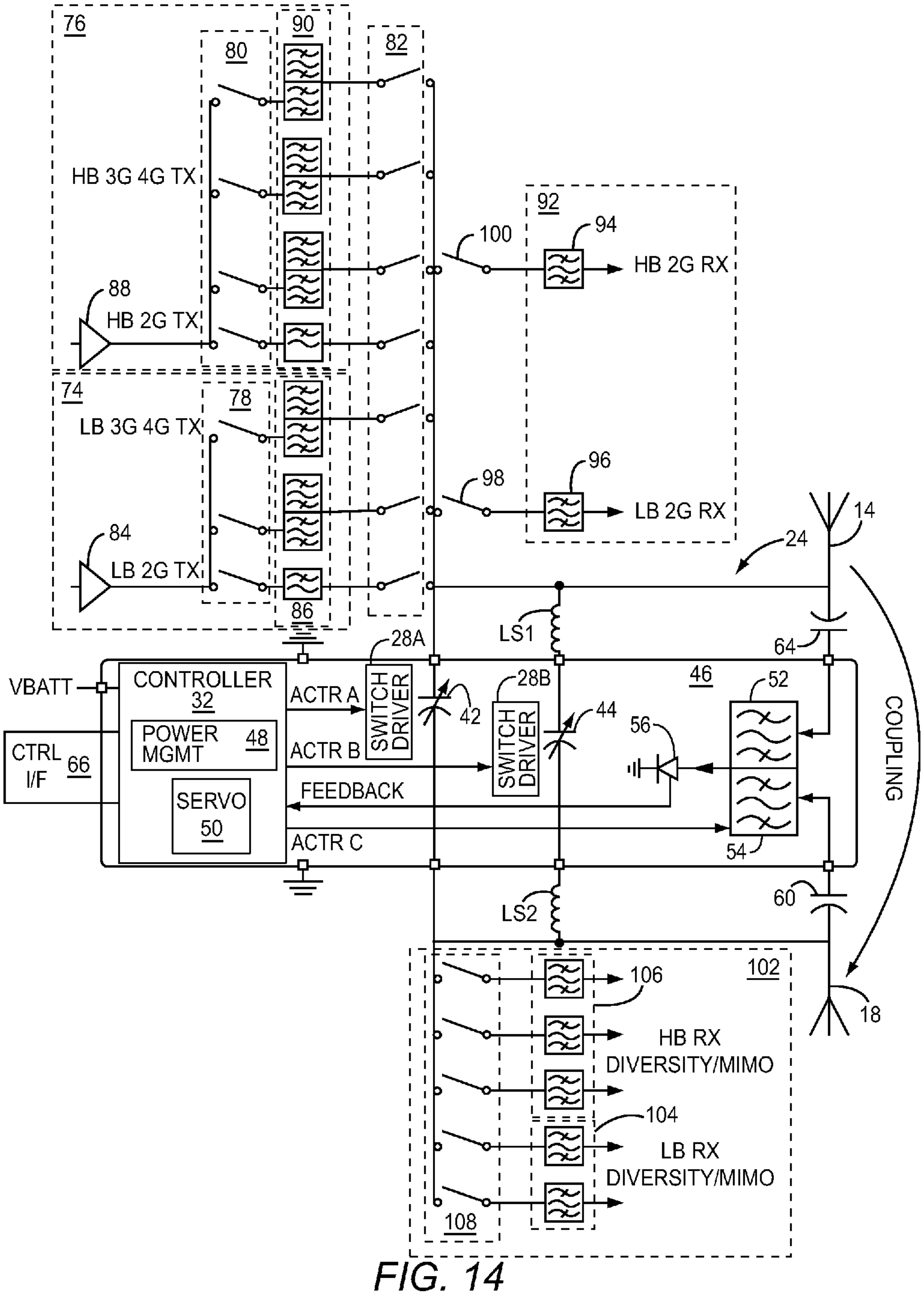
FIG. 14 depicts the AANN after adaptation for third generation (3G) operation with diversity receiver support or fourth generation (4G) operation with MIMO support.

FIG. 14 depicts the AANN 24 adapted for third generation (3G) operation with diversity receiver support or fourth generation (4G) operation with MIMO support. In this case, a low band transmitter section 74, and a high band transmitter section 76 are selectively coupled to the first antenna 14 via first switch bank 78, a second switch bank 80, and a third switch bank 82. The low band transmitter section 74 includes a low band amplifier 84 that is selectively coupled to the first antenna 14 through filters 86 for low band second generation transmission (LB 2G TX) and LB 3G/4G TX. The high band transmitter section 76 includes a high band amplifier 88 that is selectively coupled to the first antenna 14 through filters 90 for HB 2G TX and HB 3G/4G TX. Moreover, a first receiver section 92 includes an LB 2G RX filter 94 and an HB 2G RX filter 96 that are selectively coupled to the first antenna 14 via LB switch 98, and an HB switch 100. A second receiver section 102 includes filters 104 for LB RX Diversity and MIMO as well as filters 106 for HB RX Diversity and MIMO that are selectively coupled to the second antenna 18 via a fourth switch bank 108.

Figure 15:
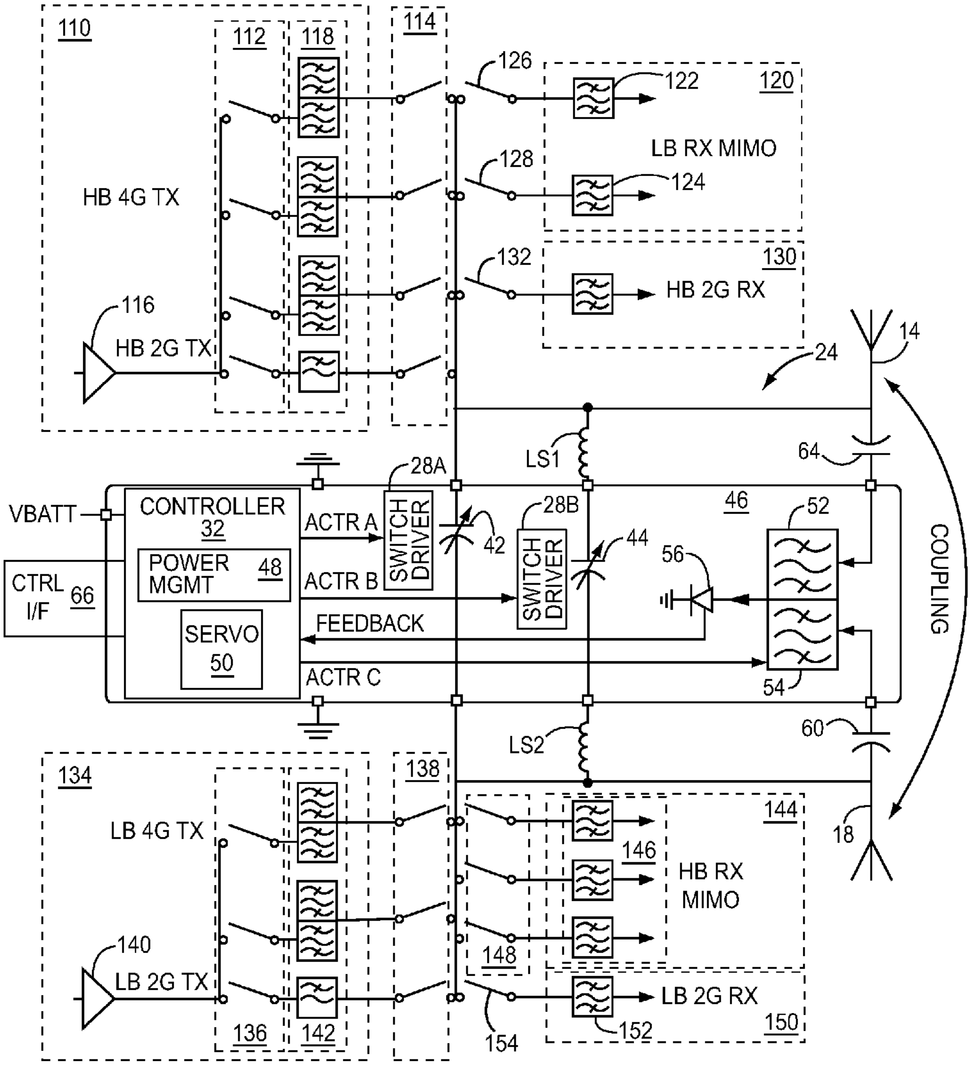
FIG. 15 depicts the AANN after adaptation for 4G operation with MIMO support.

FIG. 15 depicts another structure for the FERA 10 and the AANN 24 that is adapted for 4G operation with MIMO support. In particular, the first antenna 14 and the second antenna 18 are both adapted for transmission and reception. Moreover, the first antenna 14 and the second antenna 18 are also adapted to have substantially equal performance. In this way, a TX HB section 110 can be selectively coupled to the first antenna 14 via a first HB switch bank 112 and a second HB switch bank 114. The TX HB section 110 includes an HB amplifier 116 that is selectively coupled to the first antenna 14 through HB filters 118. Moreover, an LB RX MIMO section 120 has a first LB RX MIMO filter 122 that is selectively coupled to the first antenna 14 via a first LB RX MIMO switch 126. The LB RX MIMO section 120 also includes a second LB RX MIMO filter 124 that is selectively coupled to the first antenna 14 via a second LB RX MIMO switch 128. An HB 2G RX section 130 includes an HB 2G RX filter that is selectively coupled to the first antenna 14 via an HB 2G RX switch 132.

Similarly, a TX LB section 134 can be selectively coupled to the first antenna 14 via a first LB switch bank 136 and a second LB switch bank 138. The TX LB section 134 includes an LB amplifier 140 that is selectively coupled to the first antenna 14 through HB filters 142. Moreover, an HB RX MIMO section 144 has HB RX MIMO filters 146 that are selectively coupled to the first antenna 14 via an HB RX MIMO switch block 148. An LB 2G RX section 150 includes an LB 2G RX filter 152 that is selectively coupled to the first antenna 14 via an LB 2G RX switch 154. This configuration for AANN 24 has the potential to provide improved selectivity for the RF detector 56, and reduced loading on the antenna switches. Once tuned, the AANN 24 decouples the first antenna 14 from the second antenna 18, thereby reducing the impact of TX blockers on linearity requirements for MIMO operation.

Figure 16:
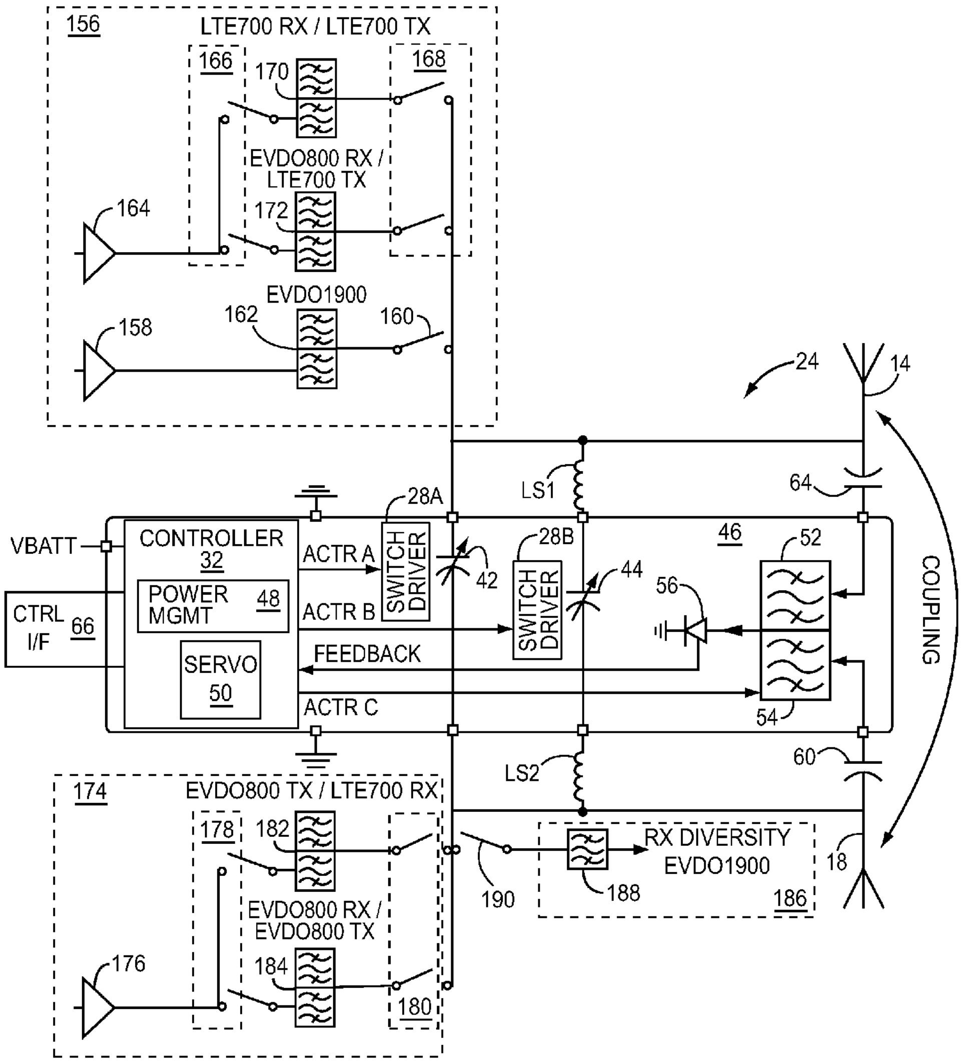
FIG. 16 depicts the AANN after adaptation for simultaneous EVDO800 and LTE700 transmission.

FIG. 16 depicts the AANN 24 configured for simultaneous evolution-data optimized 800 MHz (EVDO800) and long term evolution 700 MHz (LTE700) transmission. In this case, a first transceiver section 156 has an EVDO1900 amplifier 158 that is coupled to the first antenna 14 via a TX switch 160 through an EVDO1900 filter 162. The transceiver section 156 also includes an LTE700 amplifier 164 that is selectively coupled to the first antenna 14 via a first switch bank 166 and a second switch bank 168 through an LTE700 RX/LTE700 TX filter block 170 or an EVDO800 RX/LTE700 TX filter block 172.

A second transceiver section 174 has an EVDO800 amplifier 176 that is selectively coupled to the second antenna 18 via a third switch bank 178 and a fourth switch bank 180 through an EVDO800 TX /LTE700 RX filter block 182 or an EVDO800 RX/EVDO800 TX filter block 184. Further still, an RX Diversity section 186 includes an EVDO1900 filter block 188 that is selectively coupled to the second antenna 18 via an RX diversity switch 190.

Certain wireless communications operators desire a mode of operation that allows simultaneous transmission of LTE700 for data and EVDO800 for voice. Such a mode of operation requires relatively high linearity for front end components such as antenna switches such as the fourth switch block 180. Both the first antenna 14 and the second antenna 18 are required for LTE700 operation in a MIMO mode, and it is also preferred that both the first antenna 14 and the second antenna 18 are used for EVDO800 operation. The LTE700 TX will broadcast from the first antenna 14 and the EVDO800 TX will broadcast from the second antenna 18 when the MIMO mode and the diversity mode are not in operation. By pairing an LTE700 TX filter with an EVDO800 RX filter into the EVDO800 RX/LTE700 TX filter block 172 and pairing an EVDO800 TX filter with LTE700 RX filter into the EVDO800 TX/LTE700 RX filter block 182, the linearity requirements for the front end components such as the second switch bank 168 is reduced. Moreover, when properly tuned, the AANN 24 increases the isolation between the first antenna 14 and the second antenna 18 such that linearity requirements for the front end components such as the second switch bank 168 and the fourth switch bank 180 are further reduced.

Figure 17:
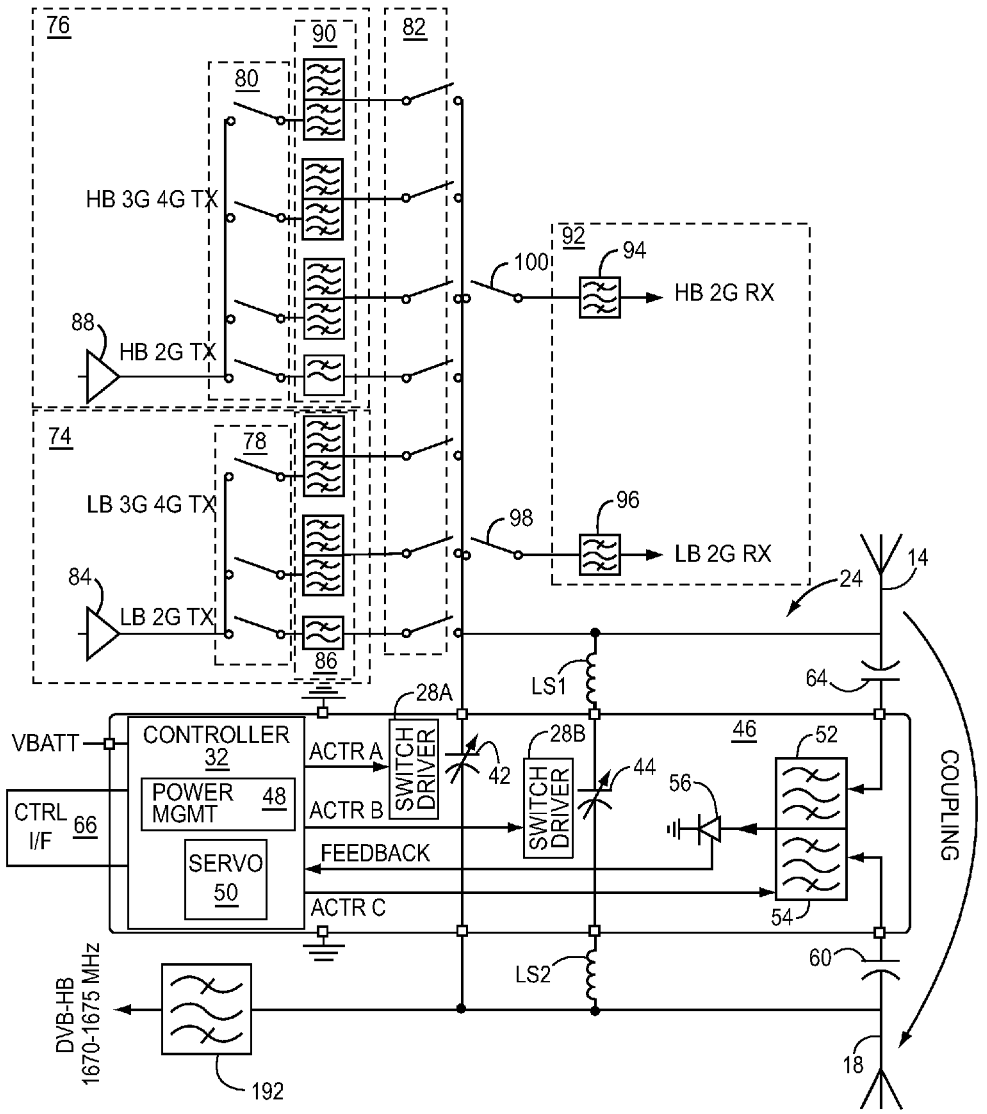
FIG. 17 depicts the AANN after an adaptation to allow coexistence of a receiver for receiving digital video broadcast handheld 3 (DVB-H3) transmissions.

FIG. 17 depicts the AANN 24 configured to allow coexistence of digital video broadcast handheld 3 (DVB-H3) with simultaneous transmissions. As with FIG. 14, the low band transmitter section 74, and the high band transmitter section 76 are selectively coupled to the first antenna 14 via the first switch bank 78, the second switch bank 80, and the third switch bank 82. The low band transmitter section 74 includes the low band amplifier 84 that is selectively coupled to the first antenna 14 through filters 86 for low band second generation transmission (LB 2G TX) and LB 3G/4G TX. The high band transmitter section 76 includes the high band amplifier 88 that is selectively coupled to the first antenna 14 through filters 90 for HB 2G TX and HB 3G/4G TX. Moreover, the first receiver section 92 includes the LB 2G RX filter 94 and the HB 2G RX filter 96 that are selectively coupled to the first antenna 14 via the LB switch 98, and the HB switch 100. A DVB-H3 filter 192 is directly coupled to the second antenna 18. The DVB-H3 filter 192 is preferably a band pass filter that passes frequencies between 1670-1675 MHz.

As configured in FIG. 17, the AANN 24 allows for simultaneous operation within the universal mobile telecommunications system (UMTS) band 5 and the LTE band 5 along with the DVB-H3 reception. In such a case, second harmonics created by transmission of UMTS band 5 and the LTE band 5 fall within the DVB-H3 band. Once the second harmonics are captured by the second antenna 18 assigned to the DVB-H3 filter 192, the sensitivity needed for DVB-H3 reception is severely degraded. Fortunately, the sensitivity needed for DVB-H3 reception is restored once the AANN 24 isolates the second antenna 18 from the first antenna 14 such that no significant amount of second harmonics will be coupled to the second antenna 18.

Figure 18:
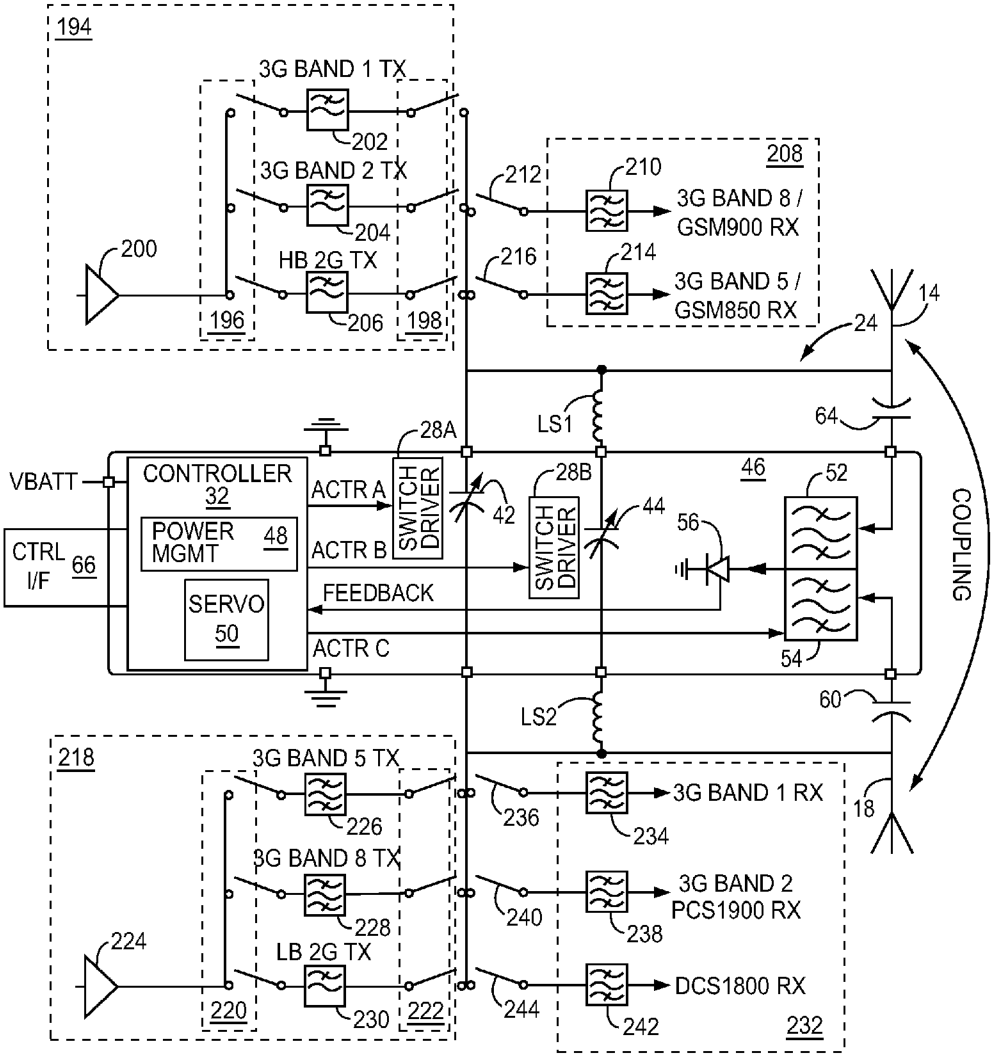
FIG. 18 depicts the AANN after an adaptation that comprises an air interface duplexer application (AIDA) for 3G.

FIG. 18 depicts the AANN 24 that is adapted for an air interface duplexer application (AIDA) for 3G. In this case, a first transmitter section 194 is selectively coupled to the first antenna 14 via first switch bank 196 and a second switch bank 198. The first transmitter section 194 has an HB amplifier 200 that is coupled to the first antenna 14 through either a 3G Band 1 filter block 202, or a 3G Band 2 filter block 204, or an HB 2G filter block 206. A first receiver section 208 includes a 3G Band 8/GSM900 RX filter block 210 that is selectively coupled to the first antenna 14 via a first RX switch 212. The 3G GSM receiver section 208 also includes a 3G Band 5/GSM850 RX filter block 214 that is selectively coupled to the first antenna 14 via a second RX switch 216. A second transmitter section 218 is selectively coupled to the second antenna 18 via a first switch bank 220 and a second switch bank 222. The first transmitter section 218 has a LB amplifier 224 that is coupled to the second antenna 18 through either a 3G Band 5 filter block 226, or a 3G Band 8 filter block 228, or a LB 2G filter block 230. A second receiver section 232 includes 3G band 1 filter block 234 that is selectively coupled to the second antenna 18 via a third RX switch 236. The second receiver 232 also includes a 3G Band 2/PCS1900 filter block 238 that is selectively coupled to the second antenna 18 via a fourth RX switch 240. The second receiver 232 further includes a DCS1800 filter block 242 that is selectively coupled to the second antenna 18 via a fifth RX switch 244. The duplex systems implement simultaneous TX and RX operation. A traditional duplexer is a radio frequency RF block that combines TX and RX signal paths. In more detail, a duplexer has a TX band pass filter and an RX band pass filter that are coupled together through a phase alignment network such that the RX filter does not load the TX filter on its pass band, and vice versa.

The AANN 24 of the present disclosure allows traditional duplexers to be eliminated by making it possible to associate 3G HB TX paths and TX filters to the first antenna 14, while associating 3G HB RX paths to the second antenna 18. Similarly, the 3G LB TX paths and TX filters would be associated with the second antenna 18, while the 3G LB RX paths would be associated with the first antenna 14. In this way, the equivalent of a traditional phase shifting network would be moved between the first antenna 14 and the second antenna 18. This new arrangement of TX and RX paths and filters along with the equivalent of the traditional phase shifting network is referred to in this disclosure as an air interface duplexer application (AIDA). The AANN 24, when tuned, provides a necessary isolation between the first antenna 14 and the second antenna 18. The advantage of the AIDA over traditional duplexers is a lower insertion loss for both the TX and the RX paths, higher filter integration capability and simpler UMTS band upgrades.

Figure 19:
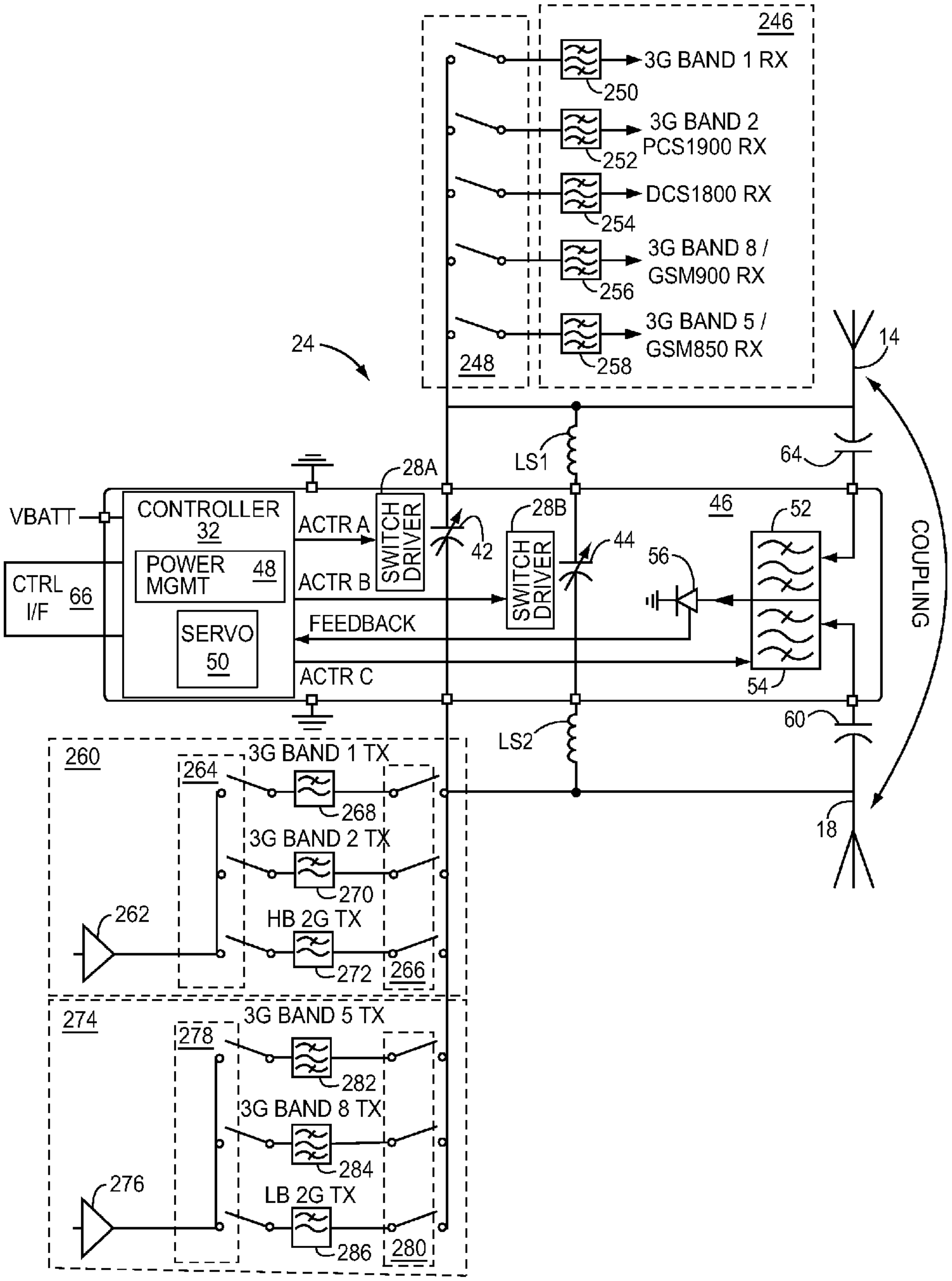
FIG. 19 depicts the AANN after adaption for an AIDA for 3G that includes a dedicated TX antenna and a dedicated RX antenna.

FIG. 19 depicts the FERA 10 and AANN 24 that is adapted for an AIDA for 3G that dedicates the first antenna 14 to transmission only and dedicates the second antenna 18 to reception only. As a result, an insertion loss for TX and RX paths is lower, thus allowing the first antenna 14 to be optimized for capturing desired RF signals. Further still, when properly tuned, the AANN 24 provides maximum isolation between the first antenna 14 and the second antenna 18, which completes an equivalent duplexer function through an air interface. In the configuration of FIG. 19, the RX paths are associated with the first antenna 14, and the TX paths are associated with the second antenna 18. In particular, a 3G receiver block 246 is selectively coupled to the first antenna 14 via an RX switch bank 248. The 3G receiver block 246 includes a 3G Band 1 filter block 250; a 3G Band 2/PCS1900 filter block 252; a DCS1800 filter block 254; a 3G Band 8/GSM900 filter block 256; and a 3G BAND 5/GSM850 filter block 258. This arrangement has an advantage of allowing the RX switches comprising the RX switch bank 248 to be made physically smaller since high power levels will not be passed through the receiver switches comprising the RX switch bank 248. A first TX section 260 includes an HB amplifier 262 that is coupled to the second antenna 18 via a first HB switch bank 264 and a second HB switch bank 266. The first TX section 260 also includes a 3G Band 1 filter block 268, a 3G Band 2 filter block 270, and an HB 2G filter block 272. A second TX section 274 includes a LB amplifier 276 that is coupled to the second antenna 18 via a first LB switch bank 278 and a second LB switch bank 280. The second TX section 274 also includes a 3G Band 5 filter block 282, a 3G Band 8 filter block 284, and an LB 2G filter block 286.

Figure 20:
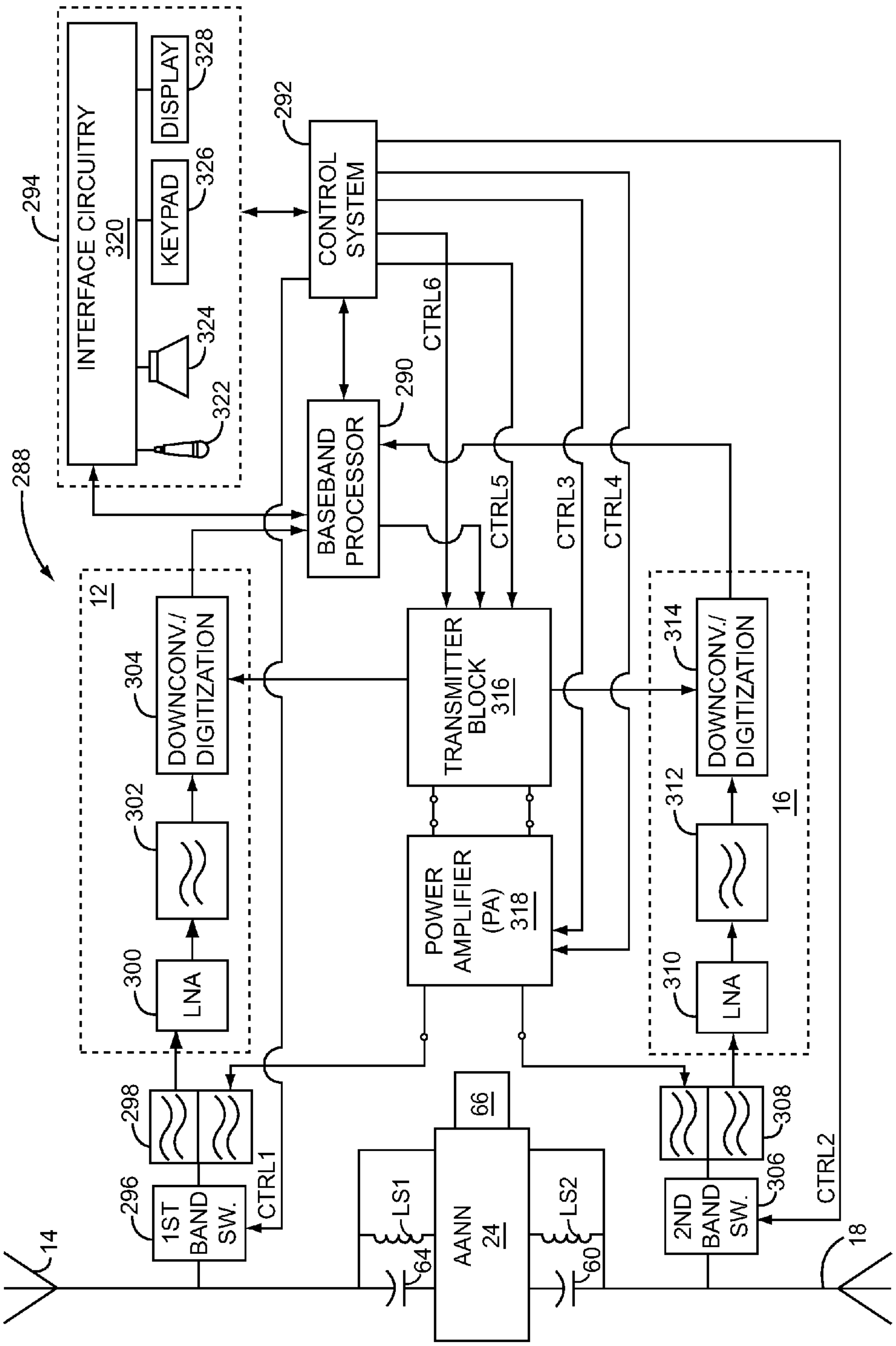
FIG. 20 depicts a mobile terminal that according to the present disclosure incorporates the AANN.

FIG. 20 depicts user equipment (UE) in the form of a mobile terminal 288 that incorporates a preferred embodiment of the AANN 24 of the present disclosure. The mobile terminal 288 may be, but is not limited to, a mobile telephone, a personal digital assistant (PDA), or the like. The basic architecture of the mobile terminal 288 may also include a baseband processor 290, a control system 292, and an interface 294. The first antenna 14 receives information-bearing RF signals from one or more remote transmitters provided by a base station (not shown). The first band switch 296 under the control of the CTRL1 signal output from the control system 292 allows the information-bearing RF signals to feed through the first duplexer 298 and into the first radio 12. The first radio 12 includes a low noise amplifier (LNA) 300 that amplifies the signal, and a filter circuit 302 that minimizes broadband interference in the received signals. The first radio 12 also includes downconversion and digitization circuitry 304, which downconverts the filtered, received signals to intermediate or baseband frequency signals, which are then digitized into one or more digital streams.

Similarly, the second antenna 18 receives information-bearing RF signals from one or more remote transmitters provided by a base station (not shown). The second band switch 306 under the control of the CTRL2 signal output from the control system 292 allows the information-bearing signals to feed through the second duplexer 308 and into the second radio 16. The second radio 16 includes a LNA 310 that amplifies the signals, and a filter circuit 312 that minimizes broadband interference in the received signals. The second radio 16 also includes downconversion and digitization circuitry 314, which downconverts the filtered, received signals to intermediate or baseband frequency signals, which are then digitized into one or more digital streams.

The baseband processor 290 processes the digitized received signals to extract the information or data bits conveyed in the received signals. This processing typically comprises demodulation, decoding, and error correction operations. As such, the baseband processor 290 is generally implemented in one or more digital signal processors (DSPs).

On the transmit side, the baseband processor 290 receives digitized data, which may represent voice, data, or control information, which it encodes for transmission, from the control system 292. The encoded data is output to the transmitter block 316. A PA 318 amplifies a first carrier to a level appropriate for transmission from the first antenna 14, while the PA 318 amplifies a second carrier to a level appropriate for transmission from the second antenna 18.

A user may interact with the mobile terminal 288 via the interface 294, which may include interface circuitry 320 associated with a microphone 322, a speaker 324, a keypad 326, and a display 328. The interface circuitry 320 typically includes analog-to-digital converters, digital-to-analog converters, amplifiers, and the like. Additionally, it may include a voice encoder/decoder, in which case it may communicate directly with the baseband processor 290.

The microphone 322 will typically convert audio input, such as the user's voice, into an electrical signal, which is then digitized and passed directly or indirectly to the baseband processor 290. Audio information encoded in the received signal is recovered by the baseband processor 290 and converted by the interface circuitry 320 into an analog signal suitable for driving the speaker 324. The keypad 326 and the display 328 enable the user to interact with the mobile terminal 288, inputting numbers to be dialed, address book information, or the like, as well as monitoring call progress information.

Figure 21:
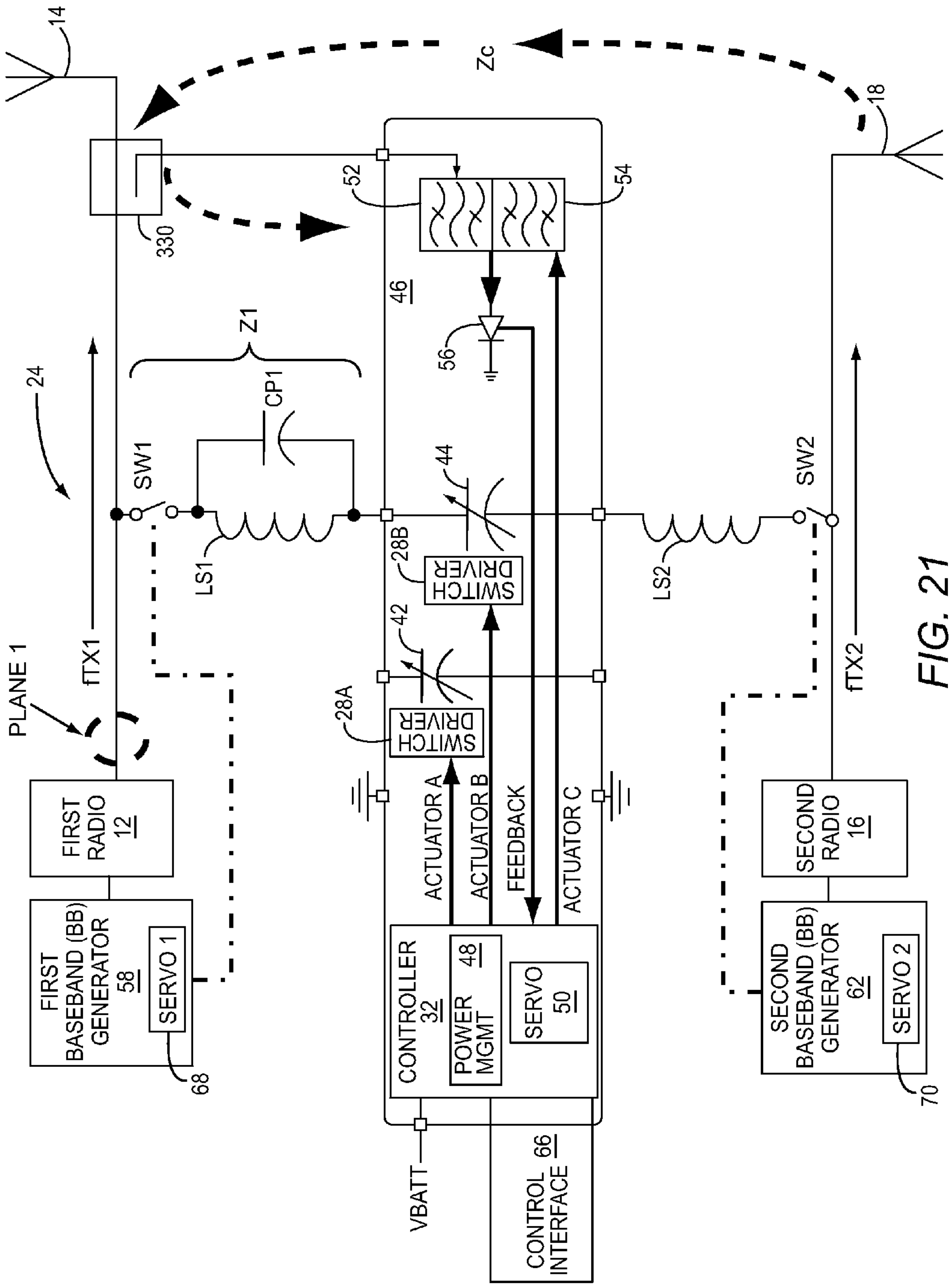
FIG. 21 depicts operational details of the AANN adapted to prevent undesirable mixing products that have a potential to interfere with sensitive receivers such as global positioning system (GPS) receivers.

FIG. 21 depicts operational details of the AANN 24 adapted to prevent undesirable mixing products that have a potential to interfere with sensitive receivers such as global positioning system (GPS) receivers. A first signal fTX1 is transmitted from the first radio 12 and a second signal fTX2 is transmitted from the second radio 16. An antenna coupling Zc between the first antenna 14 and the second antenna 18 allows the second signal fTX2 to be received by the first antenna 14. In this case, the AANN 24 is configured to neutralize the second signal fTX2, thereby reducing a second order mixing product fTX2-fTX1 at Plane 1, wherein the second signal fTX2 potentially equals a 2.4 GHz wireless local area network (WLAN) frequency and the first signal fTX1 potentially equals a global system for mobile communications (GSM) 900 MHz frequency. Neutralization of the second order mixing product fTX2-fTX1 is necessary to prevent a blocker for a receiver such as an integrated GPS receiver (not shown). Advantageously, the configuration for AANN 24 shown in FIG. 21 eliminates a need for costly and extremely linear devices for constructing front end components such the first band switch 296 (FIG. 20) and the second band switch 306 (FIG. 20).

In detail, the first antenna 14 is usable as a wideband antenna for a mobile terminal such as mobile terminal 288 (FIG. 20), while the second antenna 18 is usable as a WLAN that is more frequency selective. In this embodiment, a directional coupler 330 couples a portion of the first signal fTX1 into the first filter 52. A first switch SW1 selectively couples the first inductor LS1 to the first radio 12 and the first antenna 14. The first BB generator 58 is usable to open and close the first switch SW1. A second switch SW2 selectively couples the second inductor to the second radio 16 and the second antenna 18. The second BB generator 62 is usable to open and close the second switch SW2. A capacitor CP1 is coupled in parallel with the first inductor LS1 to provide an impedance Z1 that provides a parallel resonance for the first signal fTX1. A value of inductance for the first inductor LS1 and a value of capacitance for the capacitor CP1 are selected to create the parallel resonance for the first signal fTX1. The impedance Z1 will be inductive if the second signal fTX2 is greater than the first signal fTX1. As a result of the parallel resonance for the first signal fTX1, the second PAC 44 controlled by the signal ACTUATOR B will not be exposed to the first signal fTX1. Hence, the PAC 44 does not require that the switches SB1-SBN (FIG. 7) have high linearity.

In operation, the second order mixing product fTX2-fTX1 must be prevented from appearing at a location designated PLANE 1 in FIG. 21. If the first signal fTX1 and the second signal fTX2 create undesirable mixing signals, the first switch SW1 and the second switch SW2 are closed. As a result, the impedance Z1 is placed in series with the second PAC 44 to prevent the first signal fTX1 from entering the second PAC 44. After the switch closure of the second switch SW2, the second inductor LS2 provides a parallel resonance with the antenna coupling Zc to neutralize the coupling Zc between the first antenna 14 and the second antenna 18 for the second signal fTX2. The signal ACTUATOR B that controls the switch driver 28B, and thus the second PAC 44, is governed by a gradient search through monitoring power of the second signal fTX2 and the first antenna 14. The directional coupler 330 couples a portion of the second signal fTX2 captured by the first antenna 14 into the first pre-selection filter 52. The RF detector 56 detects the portion of the second signal fTX2 and generates the FEEDBACK signal for the controller 32. The second pre-selection filter 54 is transparent for the second signal fTX2. If the first signal fTX1 and the second signal fTX2 do not produce undesirable mixing products, the first switch SW1 and the second switch SW2 are left open.

Those skilled in the art will recognize improvements and modifications to the preferred embodiments of the present disclosure. All such improvements and modifications are considered within the scope of the concepts disclosed herein and the claims that follow.

What is claimed is:

1. An adaptive antenna neutralization network (AANN) for neutralizing coupling between a first antenna coupled to a first radio and a second antenna coupled to a second radio of a mobile terminal, the AANN comprising:

an array of reactive branches, each reactive branch including a reactive element and an electrically controlled switch with a control input for selectively coupling the reactive element between the first antenna and the second antenna;

a switch driver having an output coupled to the control input of each electrically controlled switch; and a controller having an output for sending control signals to the switch driver to turn on or off the electrically controlled switch of each reactive branch selected to produce anti-resonance to block an interfering signal from reactively coupling between the first antenna and the second antenna in response to a feedback signal generated by at least one of the first radio and second radio.

2. The AANN of claim 1, wherein the array of reactive branches is a programmable array of capacitors (PAC).

3. The AANN of claim 1, wherein the array of reactive branches is a programmable array of inductors (PAI).

4. The AANN of claim 1, wherein the array of reactive branches include inductors and capacitors.

5. The AANN of claim 1, wherein the controller is adapted to receive control signals from a baseband (BB) generator.

6. The AANN of claim 5, wherein the BB generator is adapted to execute a signal to noise (S/N) estimator that provides a discriminator function for a gradient search algorithm that selects appropriate reactive elements to couple between the first antenna and the second antenna to minimize antenna coupling.

7. The AANN of claim 1, wherein a de-coupling of the first antenna and the second antenna is bi-directional.

8. A mobile terminal comprising:

a first antenna;

a first radio coupled to the first antenna;

a second antenna;

a second radio coupled to the second antenna; and an adaptive antenna neutralization network (AANN) comprising:

an array of reactive branches, each reactive branch having a reactive element and an electrically controlled switch with a control input for selectively coupling the reactive element between the first antenna and the second antenna;

a switch driver having an output coupled to the control input of each electrically controlled switch; and a controller having an output for sending control signals to the switch driver to turn on or off the electrically controlled switch of each reactive branch selected to produce anti-resonance to block an interfering signal from reactively coupling between the first antenna and the second antenna in response to a feedback signal generated by at least one of the first radio and second radio.

9. The mobile terminal of claim 8, wherein the array of reactive branches is a programmable array of capacitors (PAC).

10. The mobile terminal of claim 8, wherein the array of reactive branches is a programmable array of inductors (PAI).

11. The mobile terminal of claim 8, wherein the array of reactive branches include inductors and capacitors.

12. The mobile terminal of claim 8, wherein the controller includes an input for receiving external control signals from a baseband (BB) generator.

13. The mobile terminal of claim 12, wherein the BB generator is adapted to execute a signal to noise (S/N) estimator that provides a discriminator function for a gradient search algorithm that selects appropriate reactive elements to couple between the first antenna and the second antenna to achieve a minimum antenna coupling.

14. The mobile terminal of claim 8, wherein a de-coupling of the first antenna and the second antenna is bi-directional.

15. An adaptive antenna neutralization network (AANN) for neutralizing coupling between a first antenna coupled to a first radio and a second antenna coupled to a second radio of a mobile terminal, the AANN comprising:

an array of reactive branches, each reactive branch including a reactive element and an electrically controlled switch with a control input for selectively coupling the reactive element between the first antenna and the second antenna;

a switch driver having an output coupled to the control input of each electrically controlled switch;

a first inductor selectively coupled between the array of reactive branches and the first antenna via a first switch that is in series with the first inductor;

a second inductor selectively coupled between the array of reactive branches and the second antenna via a second switch that is in series with the second inductor; and a controller having an output for sending control signals to the switch driver to turn on or off the electrically controlled switch of each reactive branch selected to produce anti-resonance to block an interfering signal from reactively coupling between the first antenna and the second antenna in response to a feedback signal generated by at least one of the first radio and second radio.

16. The AANN of claim 15, further including a capacitor coupled in parallel with the first inductor to provide a parallel resonance to block a signal that is transmitted from the first antenna from entering the array of reactive branches.

17. The AANN of claim 15, wherein the array of reactive branches is a programmable array of capacitors (PAC).

18. The AANN of claim 15, wherein the controller is adapted to receive control signals from a baseband (BB) generator.

19. The AANN of claim 18, wherein the BB generator is adapted to execute a signal to noise (S/N) estimator that provides a discriminator function for a gradient search algorithm that selects appropriate reactive elements to couple between the first antenna and the second antenna to minimize antenna coupling.

* * * * *